United States Patent
Blank et al.

Patent Number: 5,150,472
Date of Patent: Sep. 22, 1992

[54] CACHE MANAGEMENT METHOD AND APPARATUS FOR SHARED, SEQUENTIALLY-ACCESSED, DATA

[75] Inventors: Ted E. Blank, Wappingers Falls; Donald F. Ferguson, Port Jefferson Station; Jeffrey A. Frey, Highland; Angelo Pruscino, Poughkeepsie; Robert R. Rogers, Beacon, all of N.Y.; Erhard Rahm, Kaiserslautern, Fed. Rep. of Germany

[73] Assignee: International Business Machines Corp., Armonk, N.Y.

[21] Appl. No.: 424,455

[22] Filed: Oct. 20, 1989

[51] Int. Cl.⁵ ............................... G06F 12/08
[52] U.S. Cl. .................. 395/425; 364/DIG. 1
[58] Field of Search ............... 364/200, 900; 395/400, 395/425

[56] References Cited

U.S. PATENT DOCUMENTS

| | | | |
|---|---|---|---|
| 4,008,460 | 2/1977 | Bryant et al. | 364/200 |
| 4,264,953 | 4/1981 | Douglas et al. | 364/200 |
| 4,463,424 | 7/1984 | Mattson et al. | 364/200 |
| 4,464,712 | 8/1984 | Fletcher | 364/200 |
| 4,603,380 | 7/1986 | Easton et al. | 364/200 |
| 4,636,946 | 1/1987 | Hartung et al. | 364/200 |
| 4,835,734 | 5/1989 | Kodaira et al. | 364/900 |
| 4,926,317 | 5/1990 | Wallach et al. | 364/200 |

FOREIGN PATENT DOCUMENTS

0097256  5/1983  European Pat. Off.

OTHER PUBLICATIONS

"Prefetching in File Systems for MIMD Multiprocessors" by C. S. Ellis, et al., Proceedings of the 1989 International Conference on Parallel Processing vol. I, Aug. 1989 pp. 306-314.
"Sequential Staging Control" by M. T. Benhase, et al. IBM Tech. Discl. Bulletin, vol. 26, No. 7B, Dec. 1983 pp. 3817-3819.

Primary Examiner—Stuart S. Levy
Assistant Examiner—Reba I. Elmore
Attorney, Agent, or Firm—William B. Porter

[57] ABSTRACT

Page management mechanisms provide candidates for page stealing and prefetching from a main storage data cache of shared data when the jobs sharing the data are accessing it in a sequential manner. Pages are stolen behind the first reader in the cache, and thereafter at locations least likely to be soon re-referenced by trailing readers. A "clustering" of readers may be promoted to reduce I/O contention. Prefetching is carried out so that the pages most likely to be soon referenced by one of the readers are brought into the cache.

16 Claims, 26 Drawing Sheets

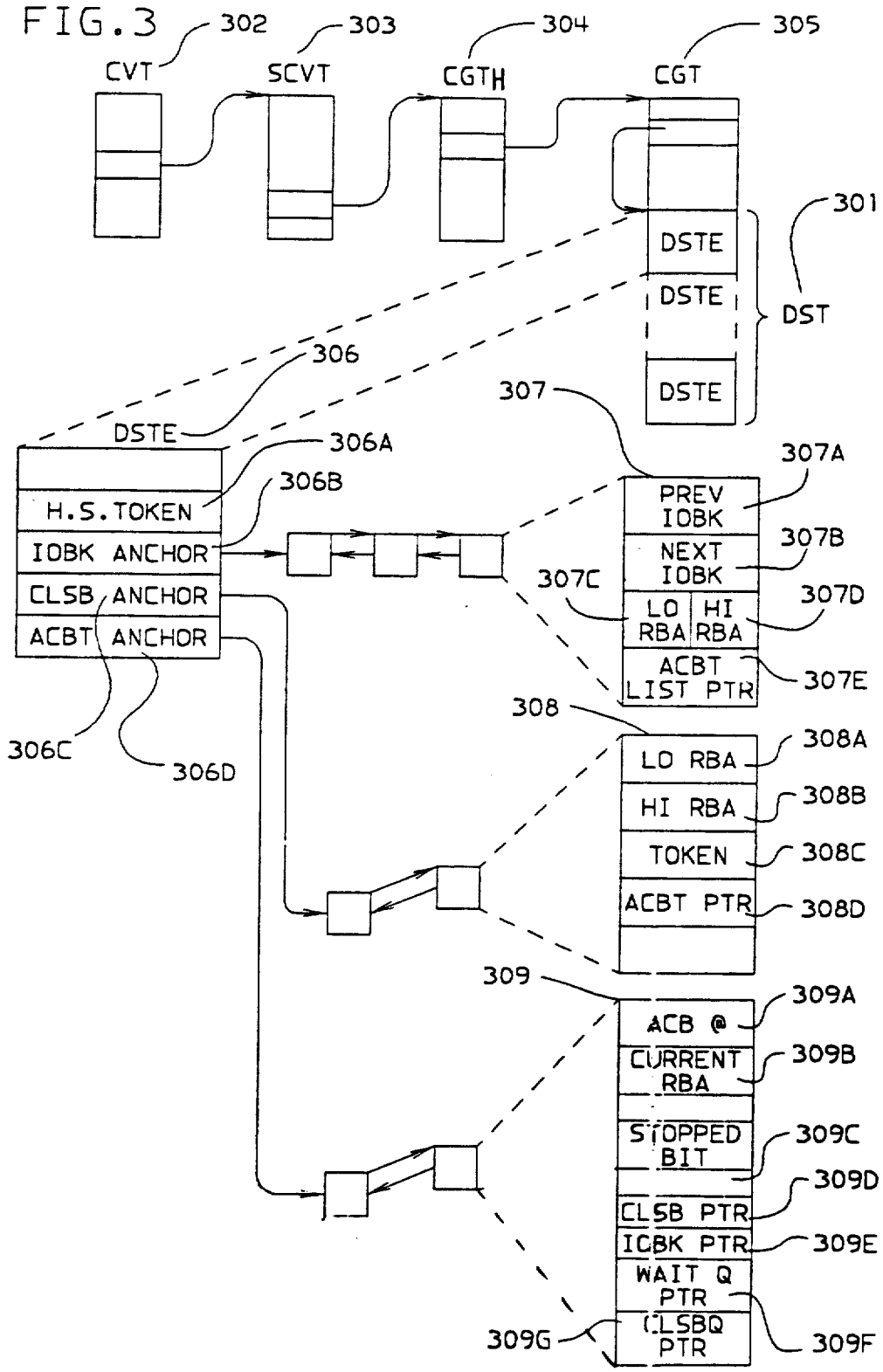

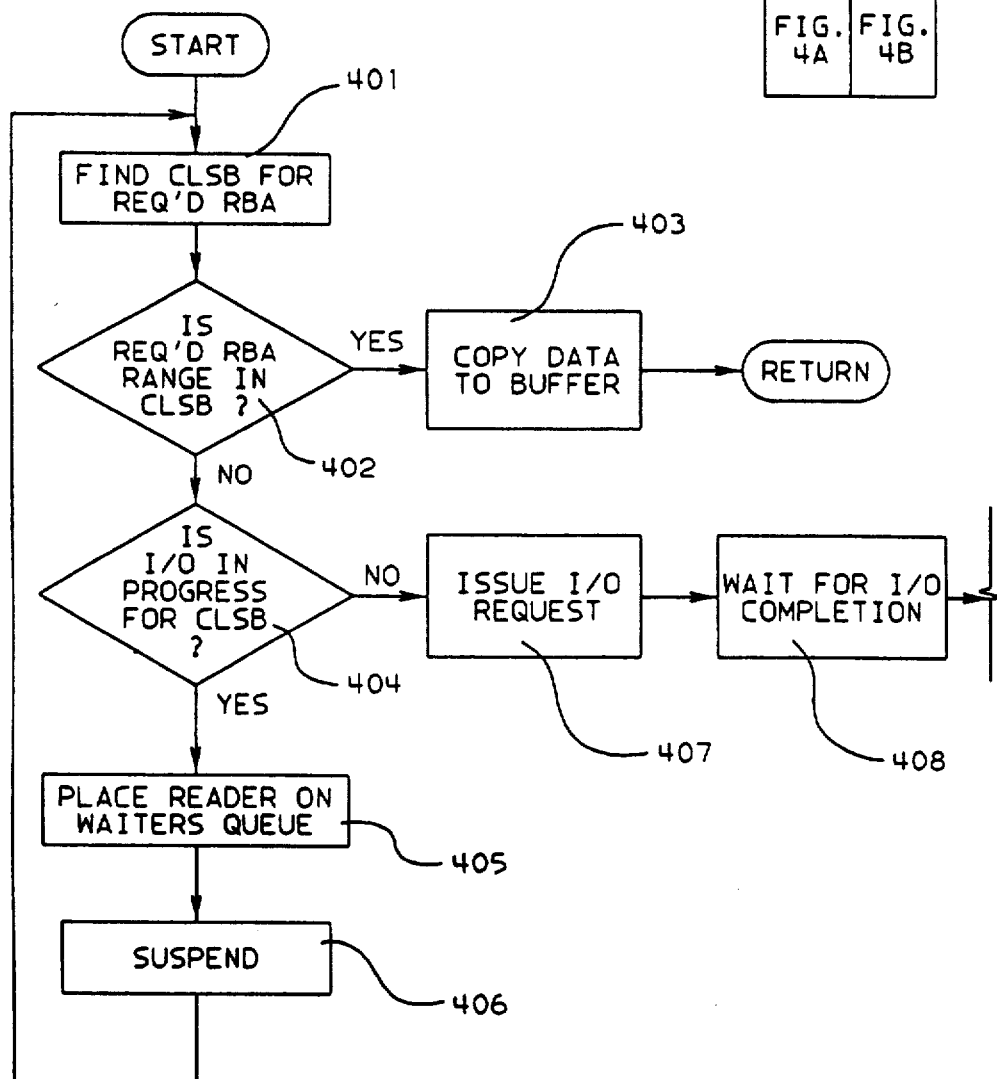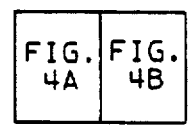

READ-REQUEST

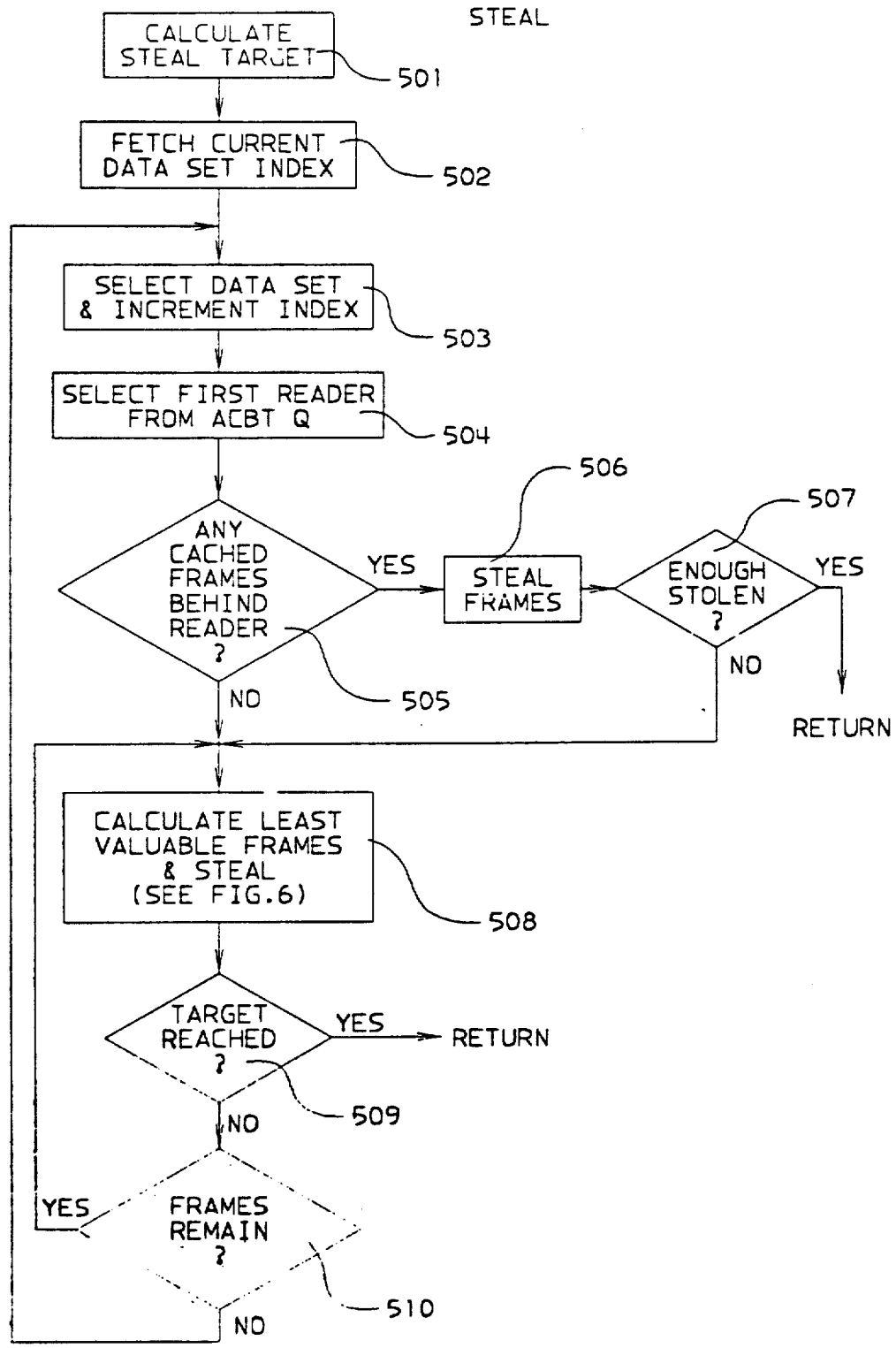

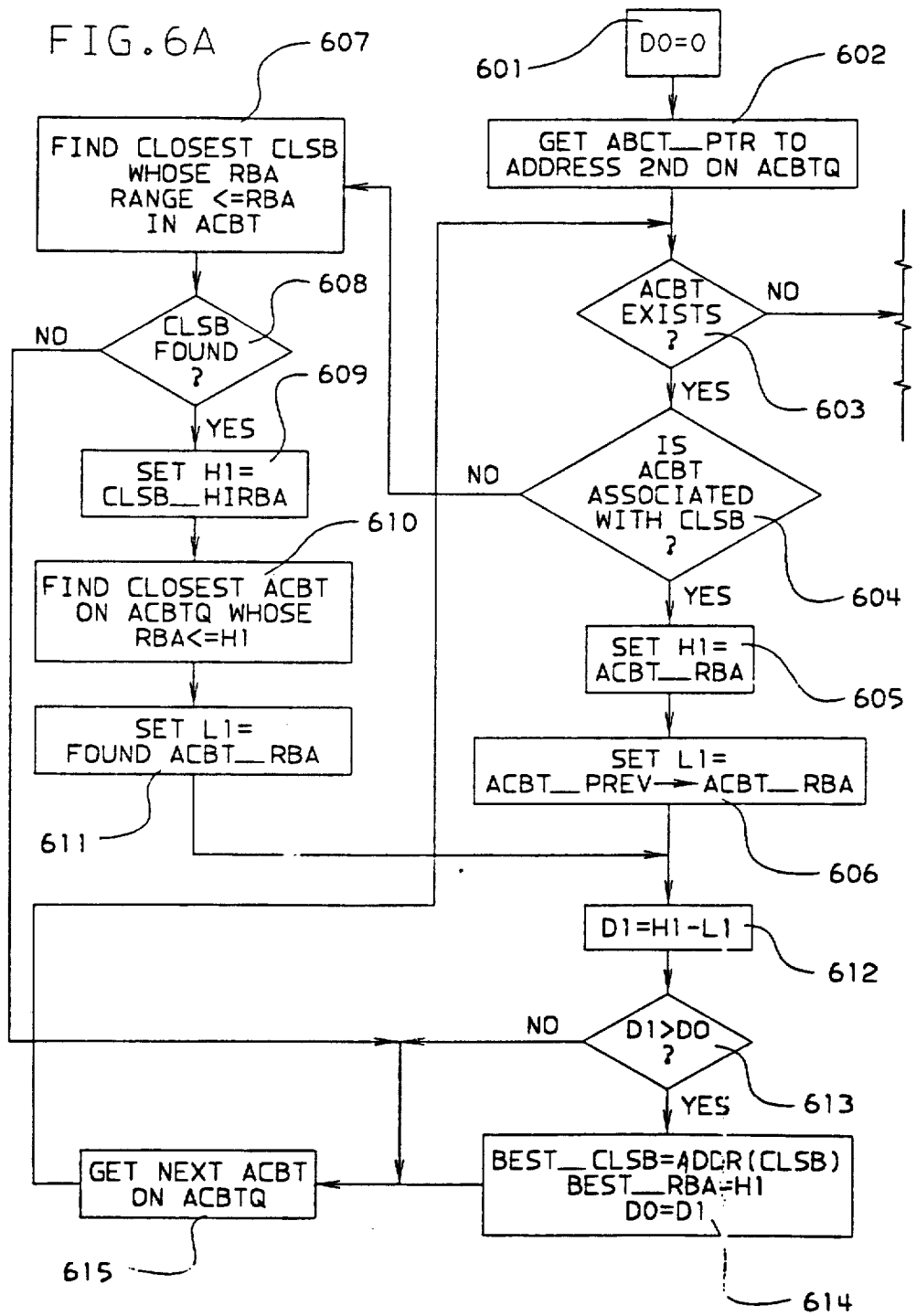

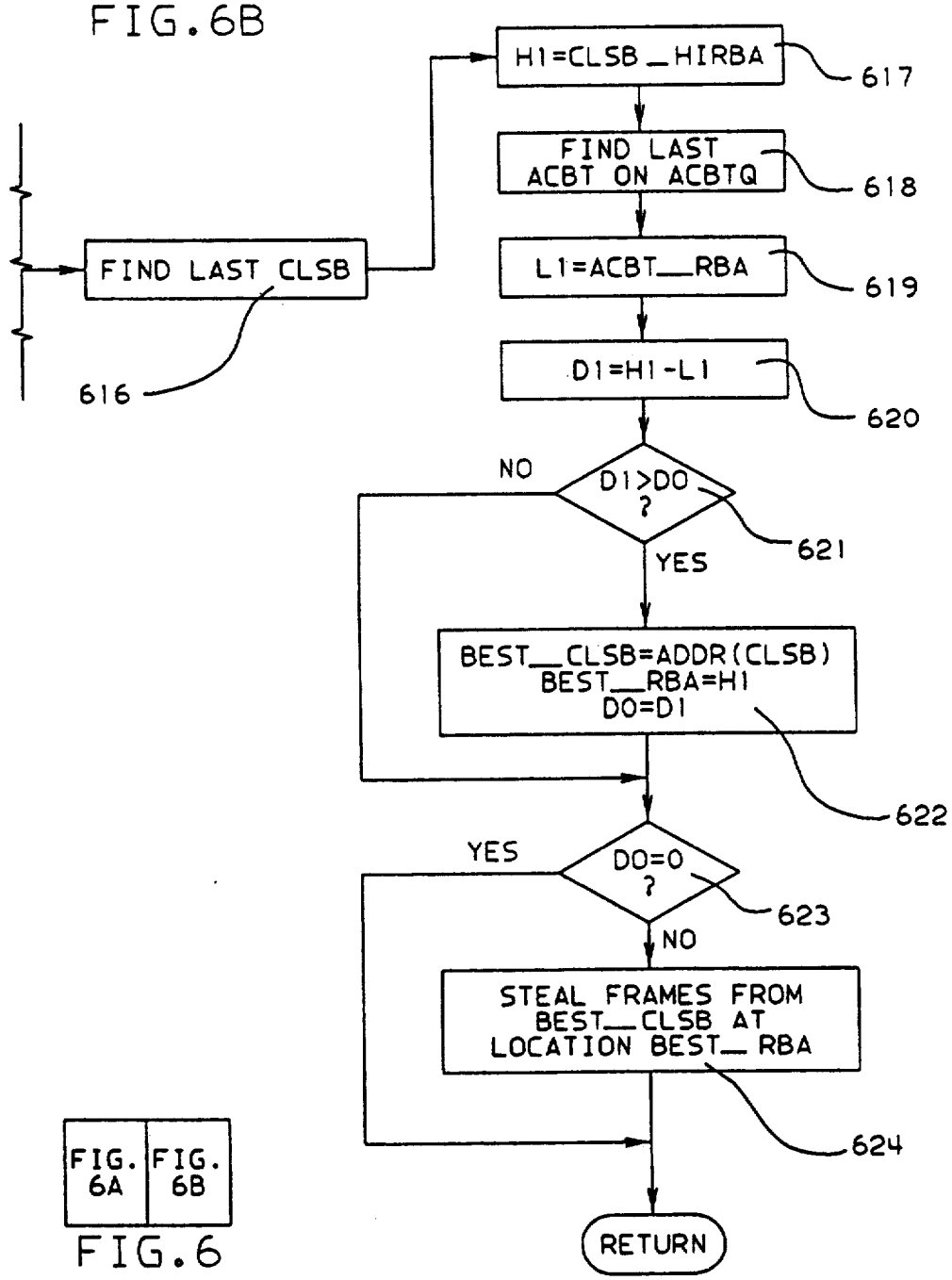

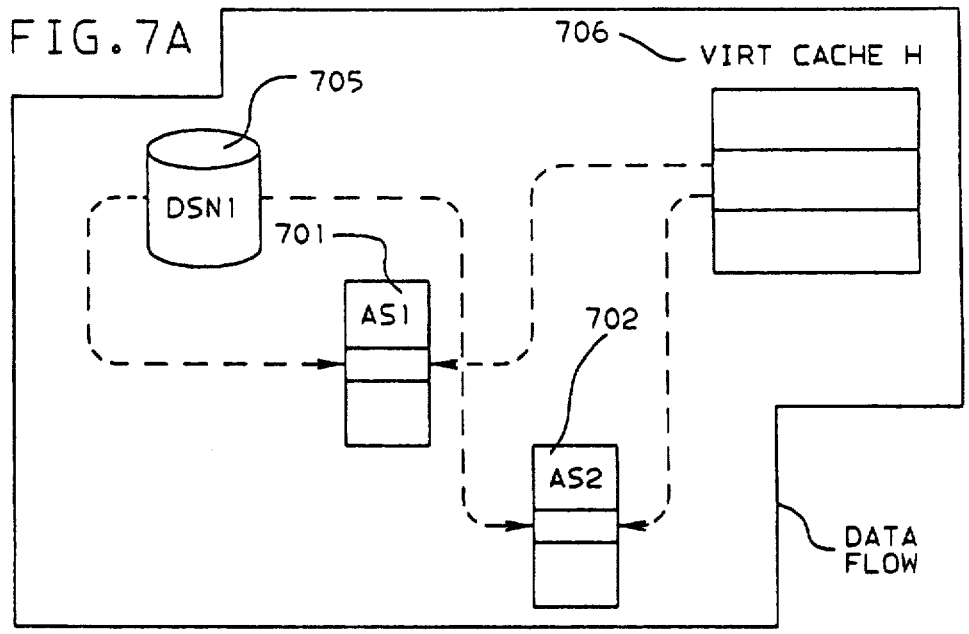
FIG. 7A
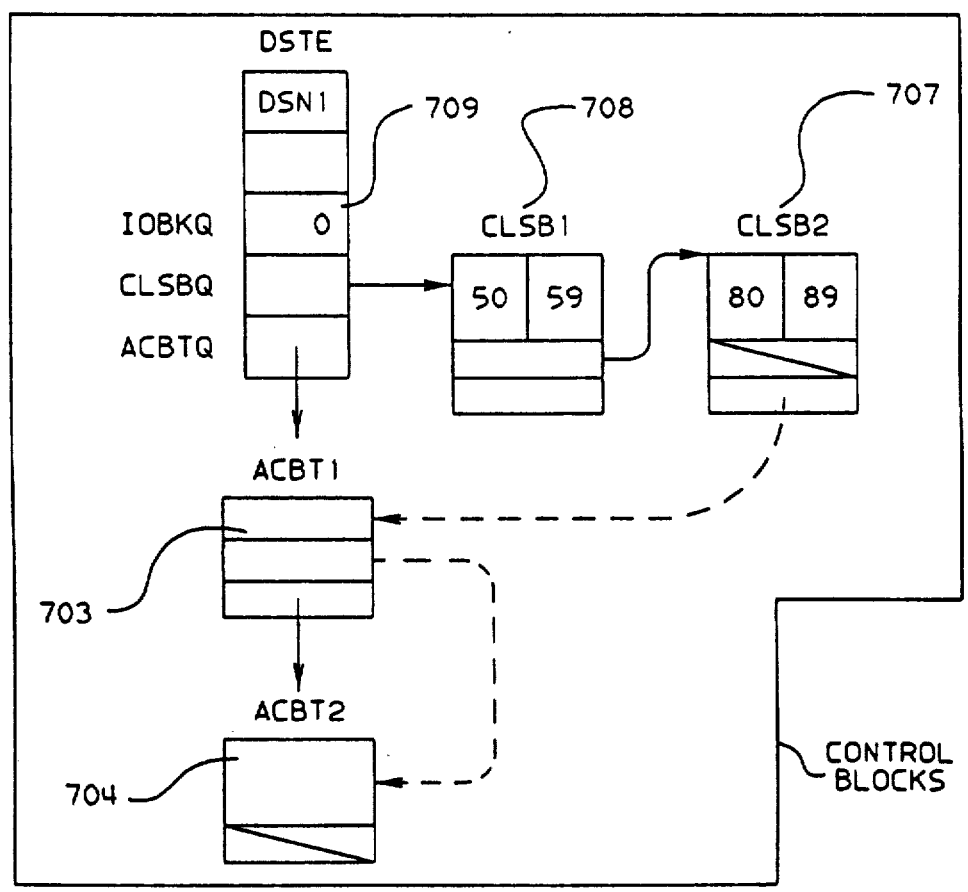

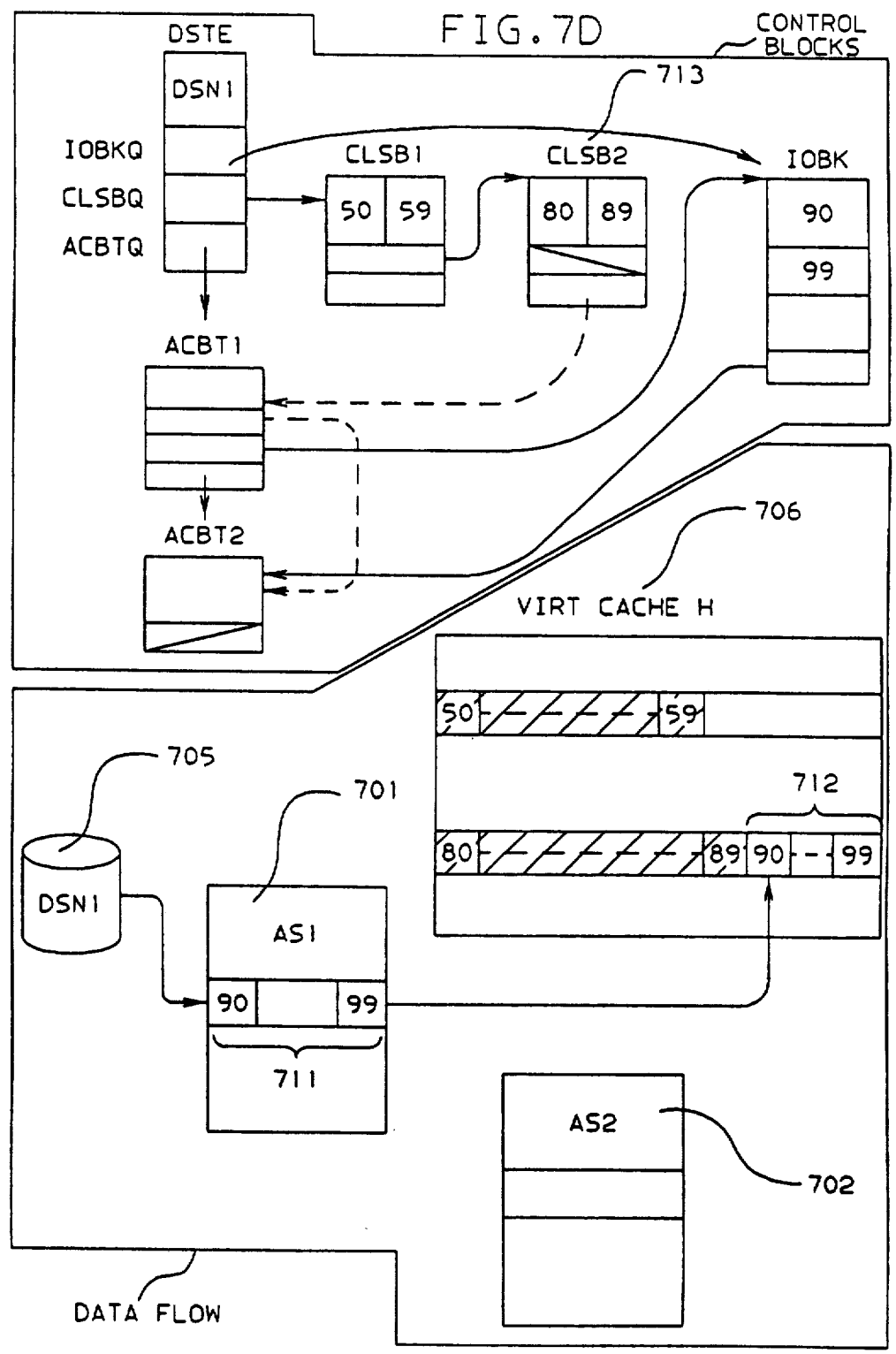

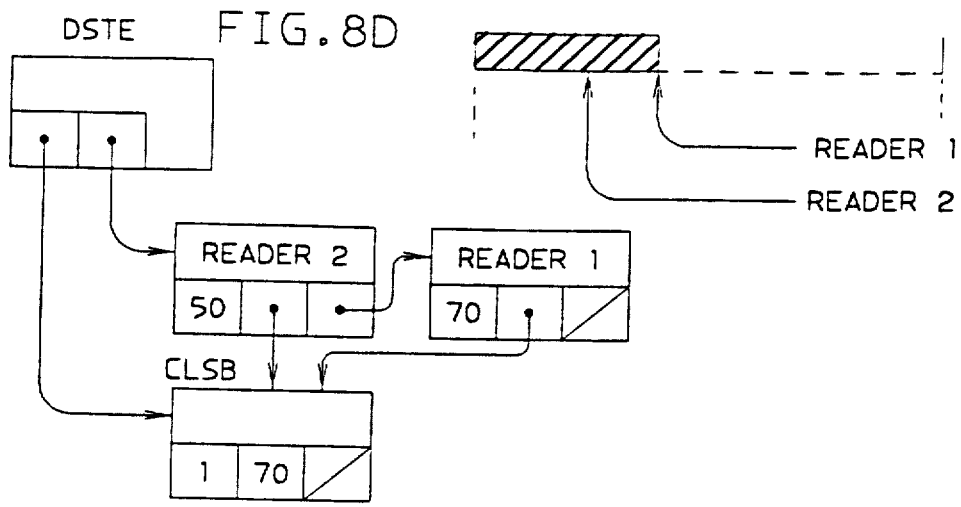
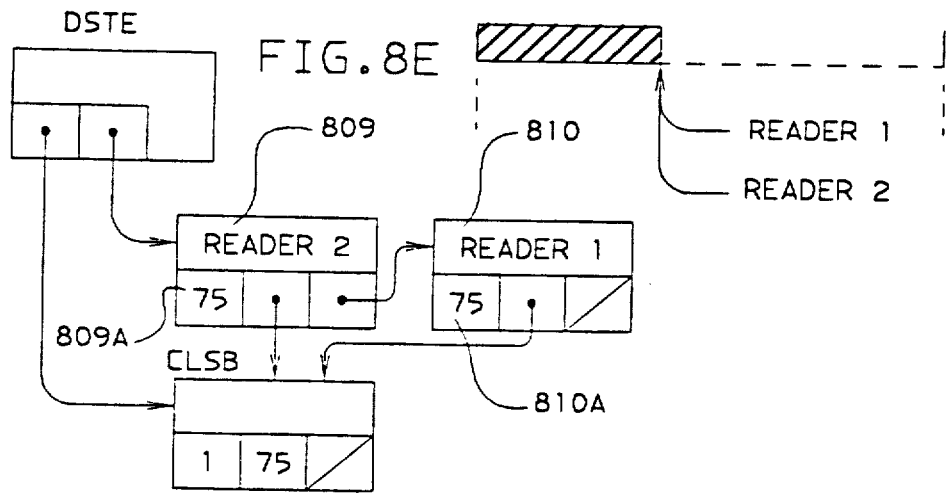
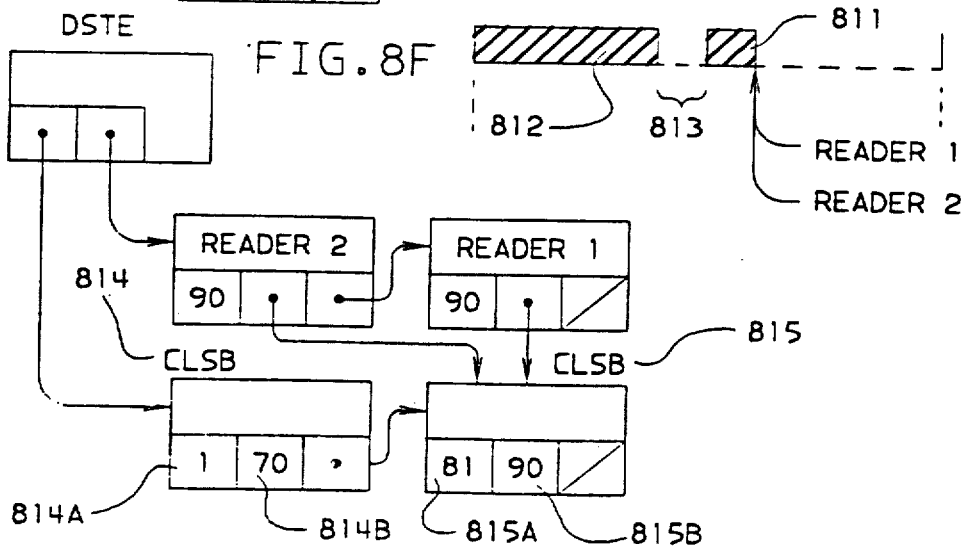

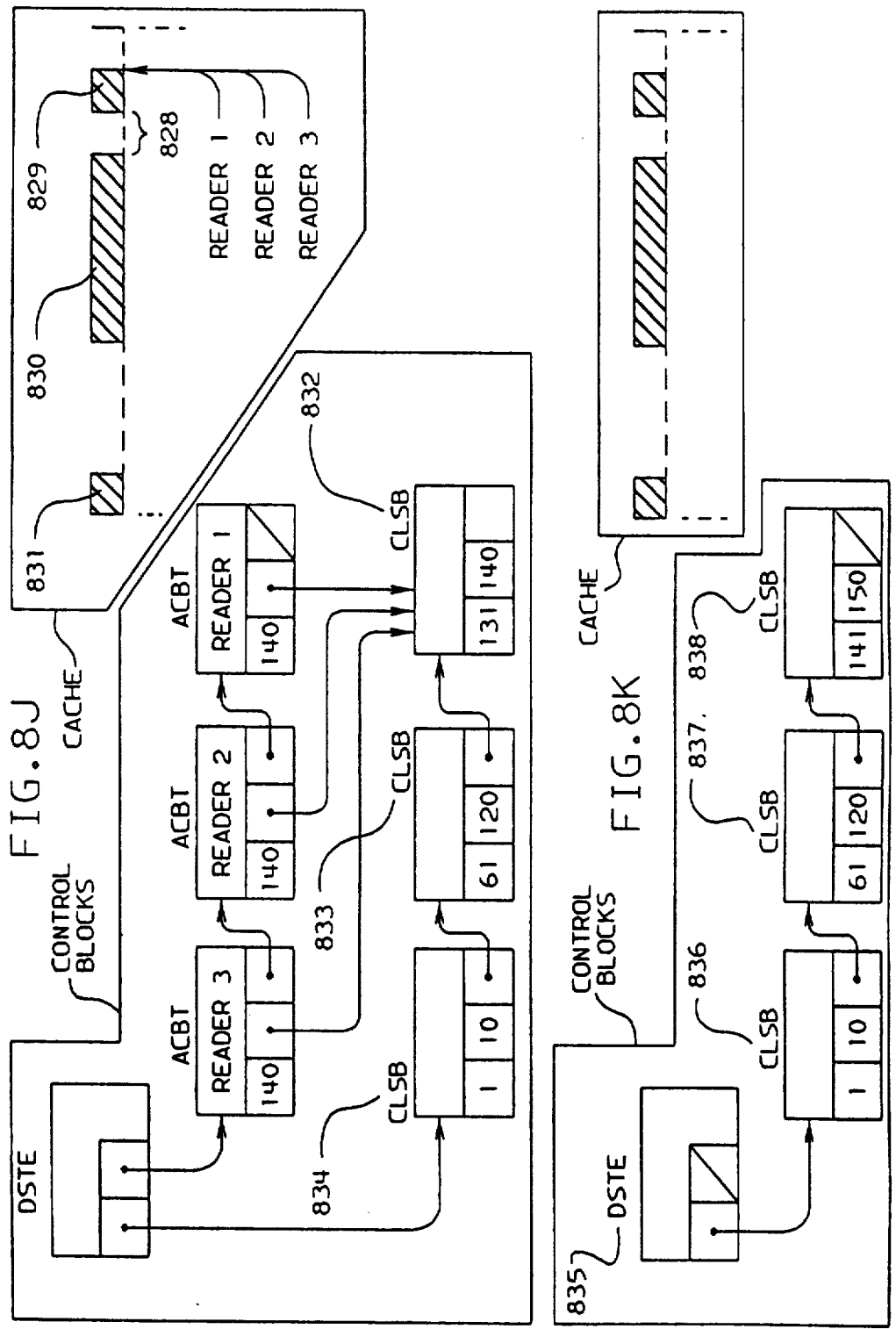

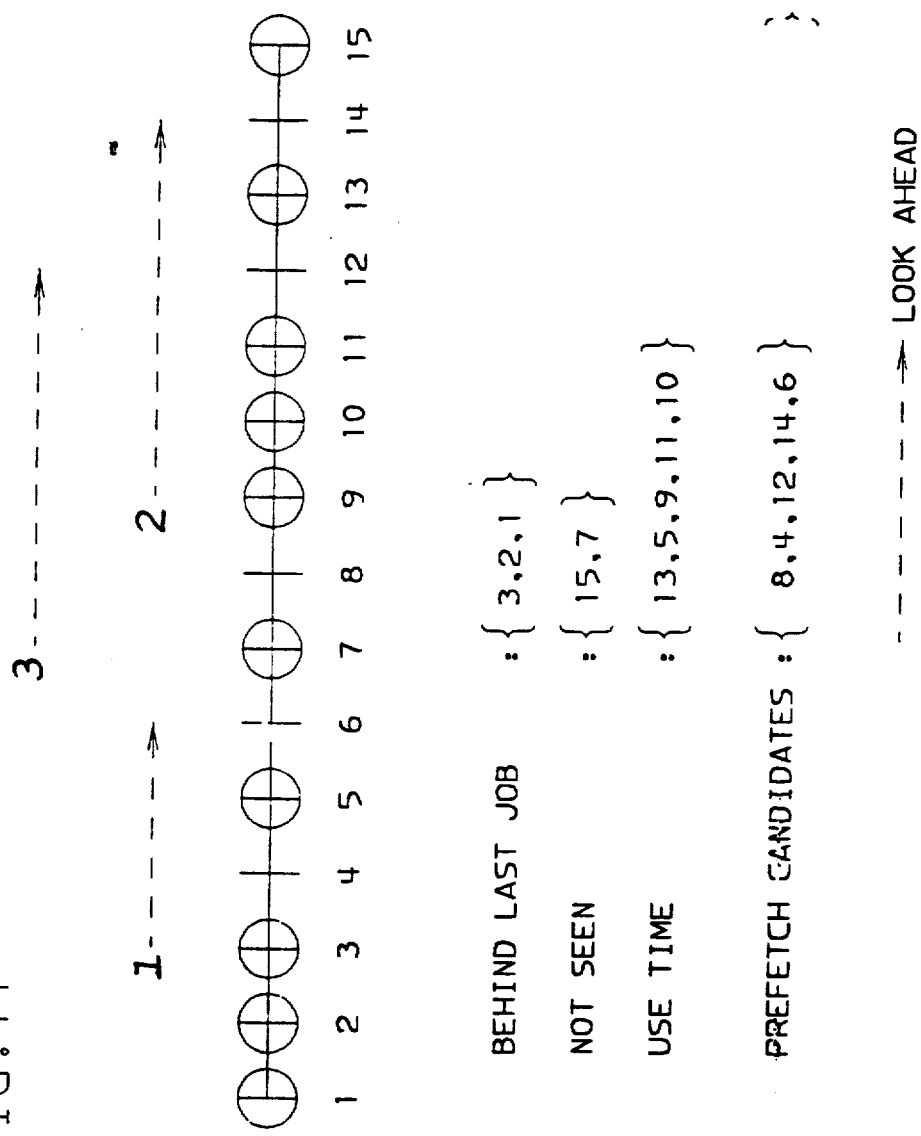

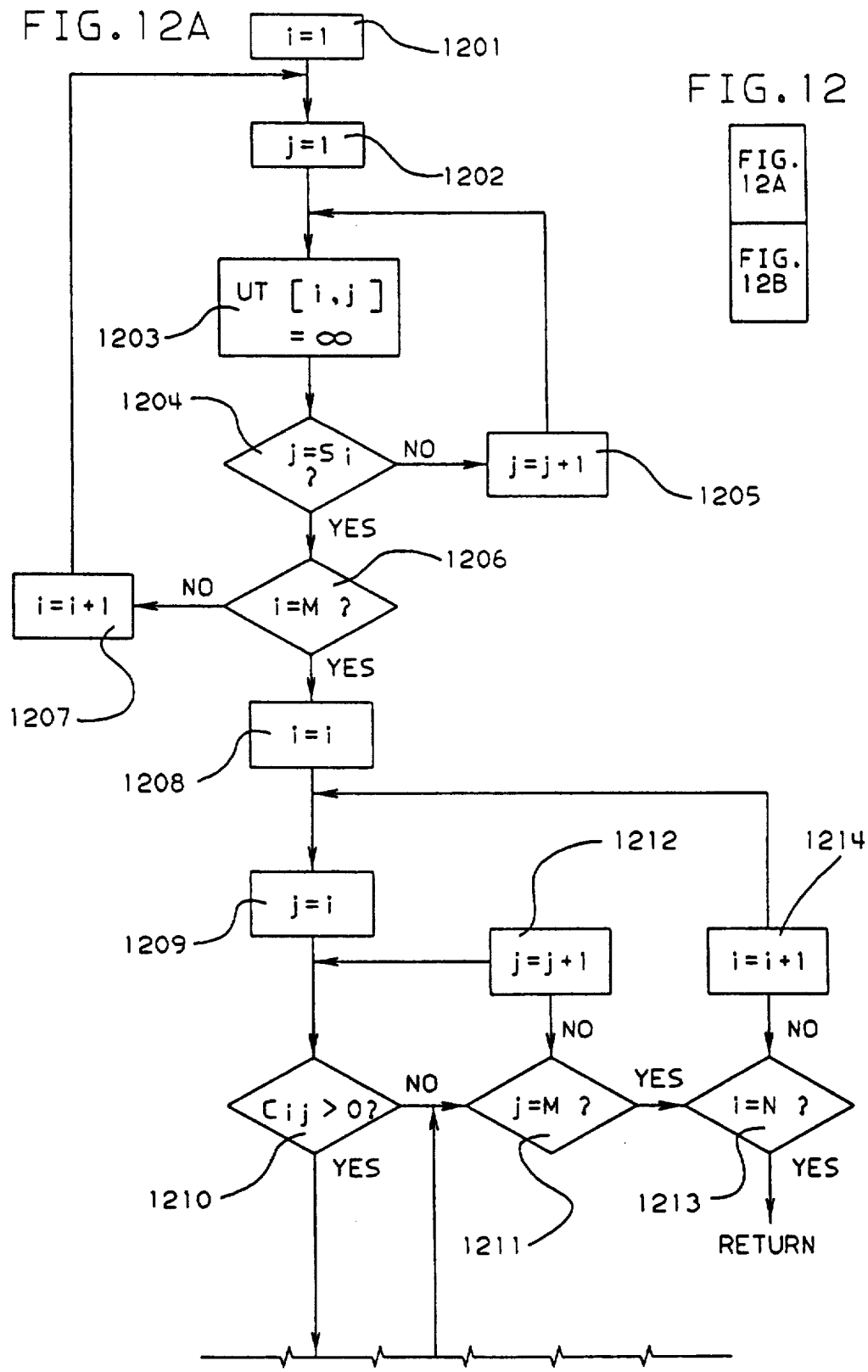

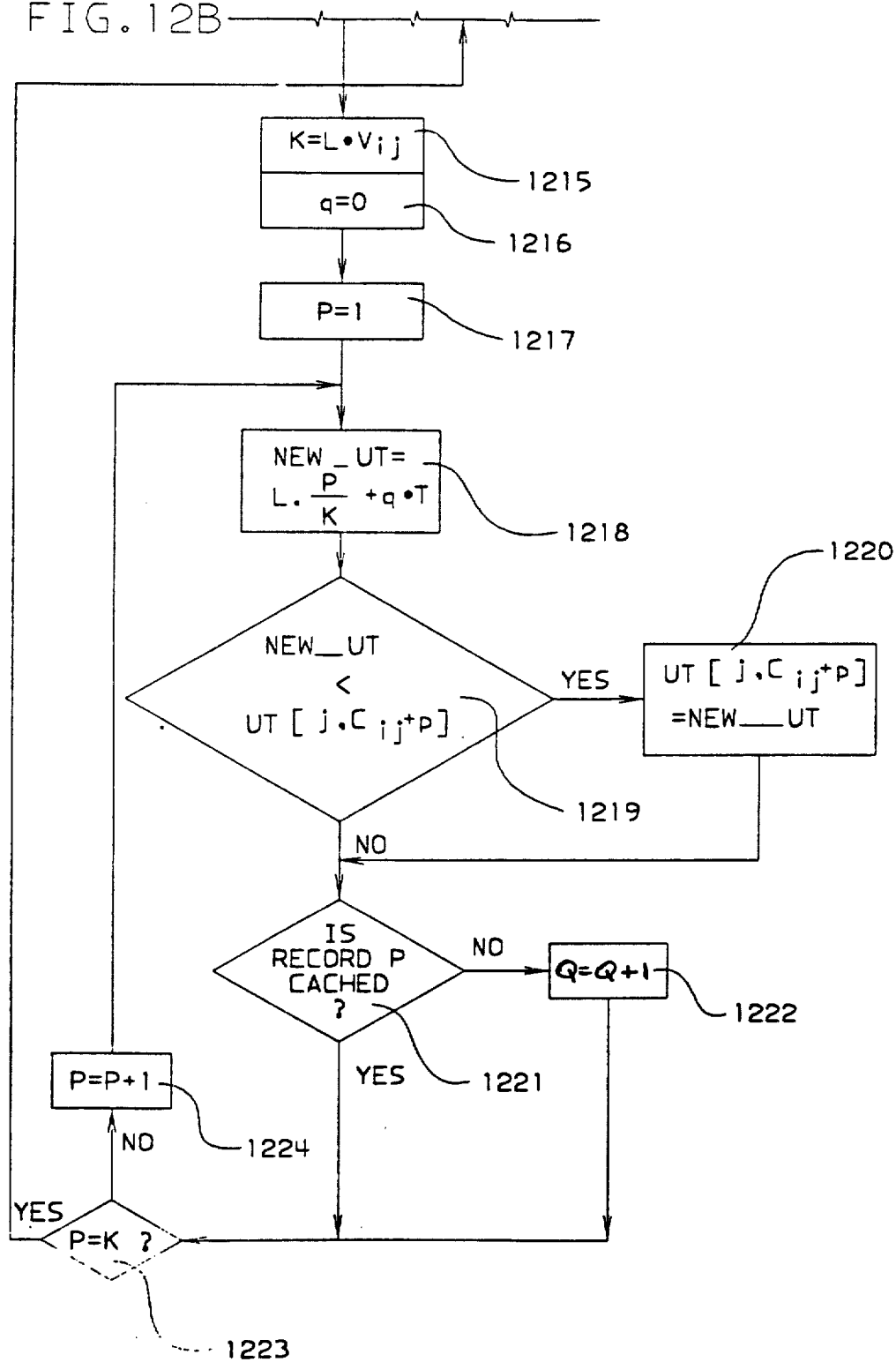

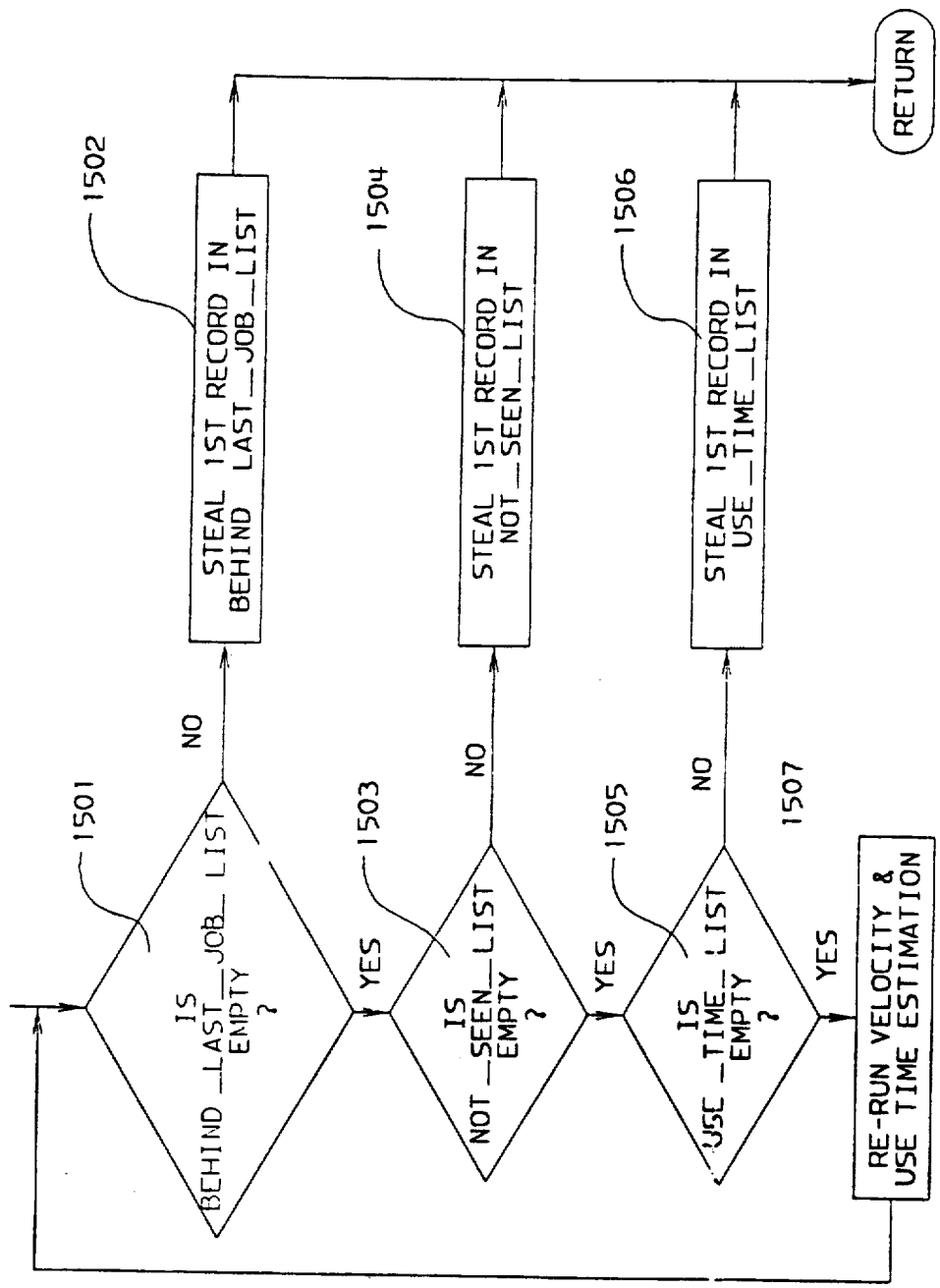

CACHE MANAGEMENT METHOD AND APPARATUS FOR SHARED, SEQUENTIALLY-ACCESSED, DATA

BACKGROUND OF THE INVENTION

1. Field of the Invention

This invention relates to computers and computer complexes, and operating systems for controlling them. More particularly, this invention describes techniques for improved management of cached data which is sequentially accessed, and shared.

2. Background Art

Improving performance by caching data in high speed memory is a common strategy used in many computer systems. In managing caches, two common techniques are page replacement algorithms and prefetching algorithms. Page replacement algorithms are used to eliminate data that is unlikely to be used in favor of data that is more likely to be used in the near future. Prefetching algorithms are used to bring data into the cache when it is likely to be used in the near future.

The Least Recently Used (LRU) algorithm is the cache management page replacement algorithm used in many previous systems. This algorithm assumes that records recently accessed will soon be reaccessed. This assumption is not adequate for sequential access patterns (spatial locality) when a particular job reads a particular record only once. In this case, which is frequently found in batch processing, temporal locality within a job does not exist.

When data is accessed sequentially, it may be possible to improve performance by prefetching the data before it is needed. This strategy is common in previous systems. Prefetching means that in the event of a page fault multiple physically adjacent records are fetched together in addition to the record for which the fault occurred. Simple prefetching schemes may be ineffective since records are often unnecessarily prefetched. More sophisticated strategies use a-priori knowledge obtained by analyzing program traces, accept user advice or dynamically analyze the program reference behavior, can significantly improve performance. Prefetching can improve performance in two ways: First, the I/O (Input/Output) delay and thus response time of a job (transaction, query, etc.) can be reduced by caching data prior to the actual access. Second, the I/O overhead for fetching N physically clustered records is usually much smaller than N times the cost of bringing in one record. On the other hand, prefetching of records not actually needed increases the I/O overhead and may displace other pages which are about to be referenced.

SUMMARY OF THE INVENTION

This invention describes techniques for managing data within a cache where the data is shared among multiple jobs each of which is sequentially accessing the data. It provides a first embodiment describing a page stealing technique which frees cache pages unlikely to soon be referenced by another cache reader, and a second embodiment describing an alternative page stealing technique, as well as a prefetch technique for prefetching soon-to-be-needed records into the cache.

It is an object of this invention to maximize cache hits for jobs sequentially reading common datasets whose records are cached in virtual storage, thus reducing average I/O delay per job, and reducing job elapsed time.

It is another object of this invention to provide a page replacement, or page steal, technique more effective than LRU algorithms for shared, sequentially accessed data.

It is a further object of this invention to provide a prefetch technique which may be advantageously used for cached data shared among multiple jobs each of which are sequentially accessing the data.

It is a further object of this invention to promote clustering of cache-accessors among a set of transactions sequentially accessing data in a shared cache.

BRIEF DESCRIPTION OF THE DRAWINGS

FIG. 3 is a control block structure diagram illustrating key control blocks used in the first embodiment.

FIGS. 4A and 4B together comprise FIG. 4, a flowchart illustrating control flow for a read request in the first embodiment. The manner of joining 4A and 4B is shown in the map on FIG. 4A.

FIG. 5 is a flowchart illustrating control flow for page steal processing for the first embodiment.

FIGS. 6A and 6B together comprise FIG. 6, a flowchart illustrating control flow for identifying page-steal candidates in the first embodiment. The flowcharts together comprise one chart when jointed as indicated in the map on FIG. 6B.

FIGS. 7A through 7E are control block and data flow diagrams illustrating an example use of the first embodiment, showing I/O queueing.

FIGS. 8A through 8K are control block diagrams illustrating a usage of the first embodiment in which three readers are sequentially reading a dataset.

FIG. 11 is a logical view of job progress and table content in an example use of the second embodiment.

FIGS. 12A and 12B are flowcharts illustrating the calculation of use times for certain records in the second embodiment.

FIG. 15 is a flowchart illustrating control flow for the cache replacement algorithm of the second embodiment.

DESCRIPTION OF THE PREFERRED EMBODIMENT

Figure 1:
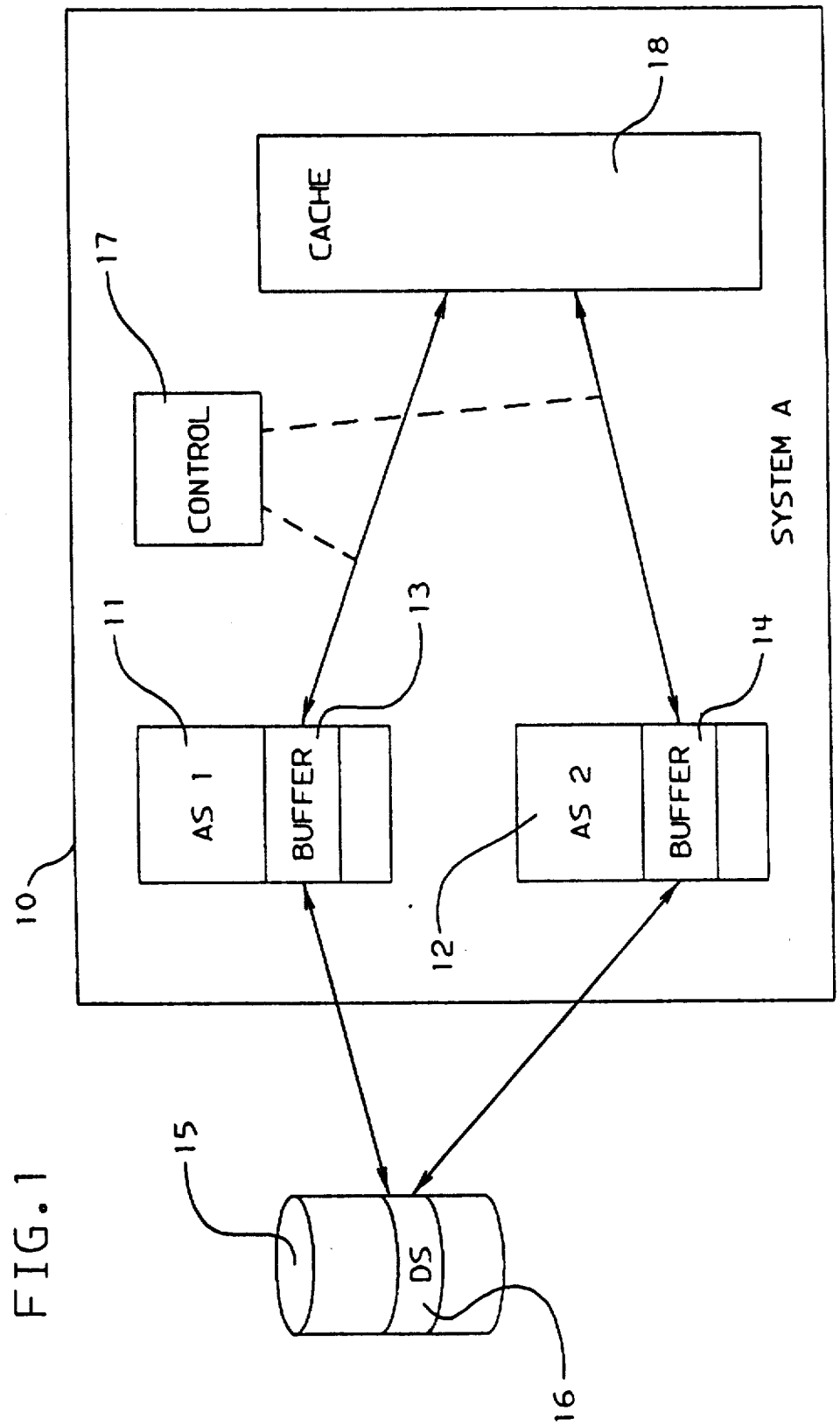
FIG. 1 is an overview diagram illustrating data flow in this invention.

FIG. 1 is a high level overview of the operation of this invention. In operating system A (10) two address spaces represent jobs which are concurrently active, address space 1 (11), and address space 2 (12). Each address space is concurrently accessing data on dataset 16, which resides on DASD device 15. Each address space is sequentially reading data from dataset 16 into its own local buffer (13, 14). As the data is read, a control element (17) dynamically determines whether the data requested resides in a cache element 18. If the data resides in cache element 18, the request is satisfied from the cache without the need for I/O to dataset 16. If the data is not yet in the cache 18, the I/O is allowed to proceed. A copy of the data is then transferred from the local buffer into which it has been read (13 or 14) into the cache element 18. If there is insufficient space in the cache element 18 to copy the data from the local buffer (13 or 14), control element 17 steals enough storage from cache 18 to allow the copy to complete. The steal mechanism of control element 17 relies on the fact that address spaces 1 (11) and 2 (12) are sequentially reading dataset 16 in making its steal decision. This page stealing is a process whereby pages in cache 18 that are least valuable—that is, least likely to be used in the near future by address space 1 or address space 2—are freed for reuse. The particulars of the steal algorithm of control element 17 are further described below.

Figure 2:
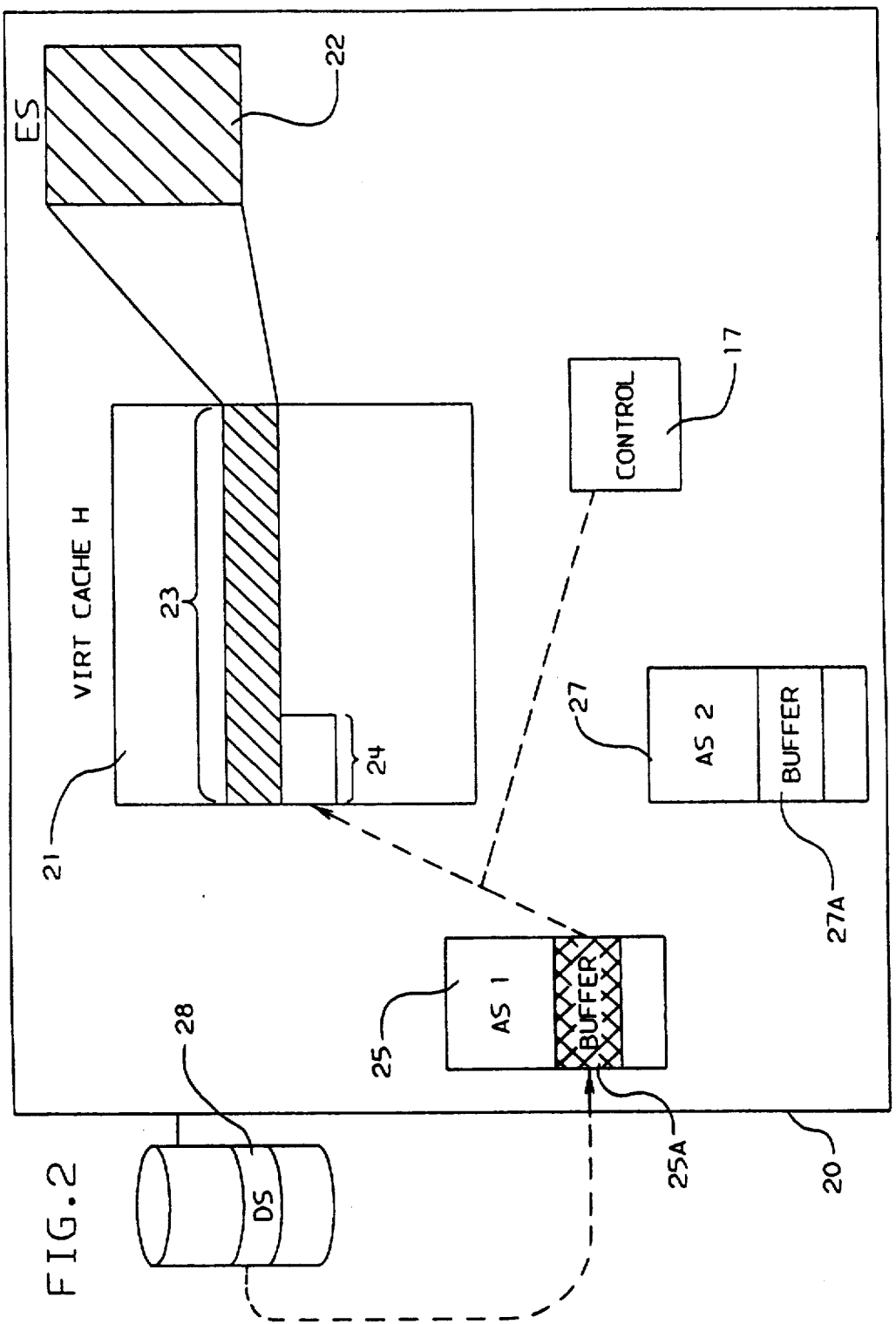
FIG. 2 is an overview diagram illustrating a first embodiment in which a nonmain storage data space is used as a virtual cache.

FIG. 2 illustrates an embodiment in which a virtual cache 21 is used which is a nonmain storage data space (or Hiperspace) of the type described in prior patent application Ser. No. 07/274,239 filed Nov. 21, 1988, and assigned to same assignee as the subject application. This nonmain storage data space virtual cache 21, also called a "hiperspace", is backed by expanded storage 22. As illustrated in FIG. 2, address spaces 1 (25) and 2 (27) have been sequentially reading dataset 28, and control element 29 has been placing data read into buffers 25A or 27A into virtual cache H(21) as appropriate. The data placed into the virtual cache occupies the virtual addresses illustrated at 23 which require all of expanded storage 22 for backing storage. When a new record is read from dataset 28 to address space 1's buffer 25A, and an attempt is made by control element 29 to copy it into virtual cache H(21) at the location indicated by 24, it is seen that no further expanded storage is available to back location 24. Therefore, the frames backing the virtual addresses indicated at 23 must be stolen to free the associated expanded storage so that the data in buffer 25A can be read to location 24 which will then be backed by the newly freed expanded storage.

FIG. 3 illustrates the primary control blocks used in the instant embodiment of the present invention. A dataset table 301, comprising dataset table entries, is chained off the communication vector table (CVT) 302 through the SCVT (Secondary Communication Vector Table) 303, which points to the cache global table header 304, in turn pointing to a cache global table 305. Each dataset table entry (DSTE) 306 comprises a token which identifies the hiperspace used for the cache for the instant data space (306A), an I/O Block anchor 306B, an anchor for a set of control blocks called cluster blocks 306B, and an anchor for an order queue called the ACBT (Access Method Control Block Tracker) queue (306D). Each I/O block 307 comprises backward and forward queue pointers (307A, 307B), the relative byte address of the lowest (307C) and highest (307D) data for which I/O has been requested, and a pointer (307E) to an ACBT subqueue of users waiting for this I/O. Each cluster block 308 is associated with a contiguous range of data within the hiperspace cache. It contains the relative byte address (RBA) of the lowest backed data in the range (308A), the RBA of the highest backed data in the range (308B), the token associated with the hiperspace (308C), and a pointer (308D) to a chain of ACBTs associated with this cluster. The order queue or ACBT queue contains control blocks, ordered by RBA of associated reader, which track ACB (Access Method Control Block) control blocks (ACBs are VSAM (Virtual Storage Access Method) control blocks that are well known, as indicated in publication OS/VS Virtual Storage Access Method, GC26-3838). Each ACBT 309 contains the address (309A) of an ACB associated with a current reader job, or address space, 310A. (A reader is a process which has established access to the dataset ) It also contains an indication of the current position within the dataset of the associated reader (309B), an indicator whether the associated user is currently suspended (309C), a pointer to the CLSB (Cluster Block) associated with the reader (309D), a pointer to an IOBK (I/O Block) (309E) when the reader is suspended waiting for an I/O, a pointer to other ACBTs (309F) waiting for a common I/O operation, and a pointer to other ACBTs (309G) chained to a common CLSB. The ACBT is created when a reader requests sequential access to a dataset which is eligible for caching (indicated by the installation on a dataset basis, for example, through an installation exit or security profile invoked during OPEN processing) and permission is granted to allow the user to participate in the caching of the dataset. This process occurs when the reader OPENs the dataset for read access. In addition, if they have not already been created, storage is allocated for the CGTH (Caching Global Table Header), CGT (Caching Global Table) and DSTEs (Data Set Table Entries). A DSTE is then assigned to represent the dataset being opened and the ACBT representing the reader is chained. IOBKs and CLSBs are created and destroyed during mainline I/O request processing and are not created as a result of OPEN processing.

Figure 4B:
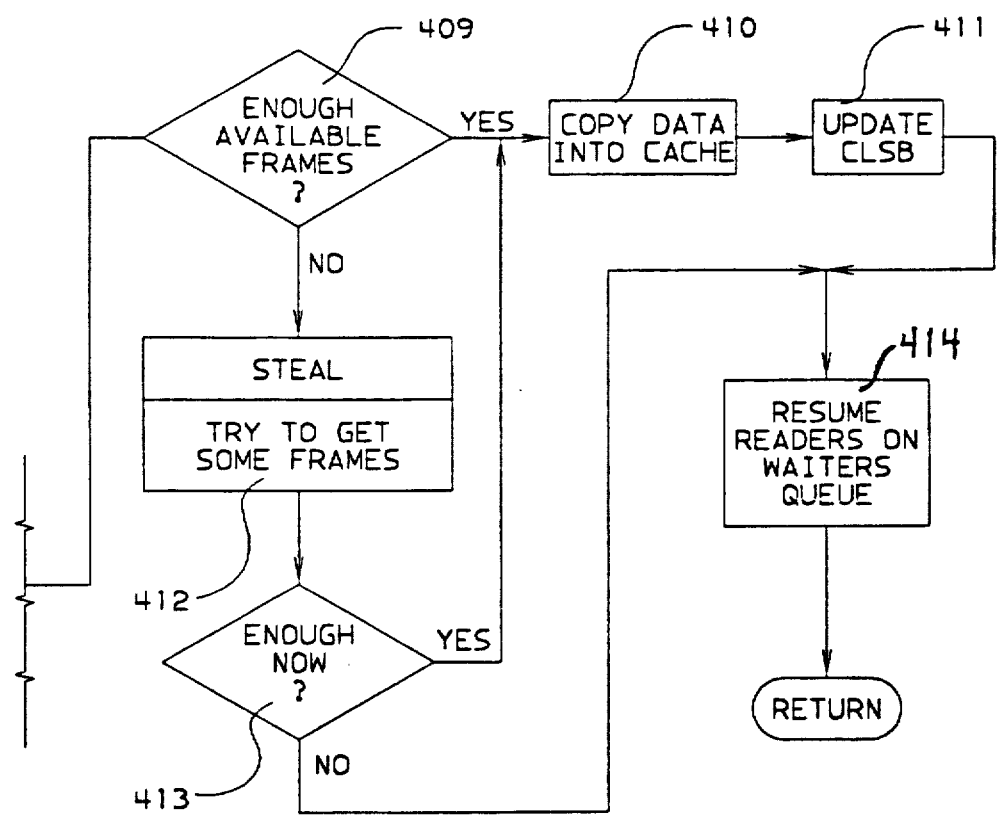

FIG. 4 illustrates the high level control flow for read requests for the instant embodiment of the present invention. When a read request is issued for a particular RBA, an attempt is made to find a cluster block (CLSB) associated with the required RBA 401. If the required RBA is found in a cluster block, 402, this indicates that the record associated with the RBA is in the hiperspace cache. The data is then copied to the requesting job's local buffer (403), and the read request is satisfied. If the requested RBA was not in a CLSB, this indicates that the required data is not yet in the hiperspace cache. However, even though it is not yet in the cache, it may be on its way into the cache. The process to transfer the record from a DASD device to a main storage buffer may have been initiated. Therefore, a test is made at 404 whether an I/O is in progress for this CLSB. This is indicated by the presence or absence of an associated IOBK. If it is found that such an I/O is in progress (i.e., there was an IOBK), the reader is placed on the waiters queue 405 anchored from the IOBK. The reader then is suspended 406 and awaits a redispatch to continue execution again at 401. If an I/O was not yet in progress (there was no IOBK), an I/O is requested 407 and an IOBK constructed and placed on the IOBK queue. The job then waits for the requested I/O to complete 408. This mechanism for performing I/O promotes "clustering" of readers within a stretch of contiguous frames in the caches, and is illustrated below in the text describing FIG. 7. "Clustering" is the process by which subsequent readers "catch up" to the reader doing the physical I/O because of the relative slowness of physical I/O as compared with data transfer from expanded storage.

When the I/O completes, so that the requested data is now in the requesting job's local buffer, a test is made 409 whether there are enough available frames to copy the data from the buffer into the hiperspace cache. (A count is maintained of the number of frames "in use", and compared against an installation-specified number of expanded storage frames which may be used to back virtual cache pages.

The count is updated to reflect the data pages copied into the hiperspace.) If there are enough frames, the data is copied into the cache, 410, and the cluster block is updated, 411, to reflect the stretch of in-cache data as it now exists. If there were not enough available frames to copy the data into the cache, the steal routine is executed to free enough storage to copy the data into the cache 412. The details of this steal routine will be elaborated on below in the descriptions of FIGS. 5 and 6. If enough storage now exists to copy the data into the cache, 413, a copy is performed as indicated above 410. If there are not enough frames, the routine is simply exited. No data is transferred to the cache, but no error is indicated. The next reader needing these pages will have to perform physical I/O. Before exiting, any suspended users are permitted to resume 414.

FIG. 5 is a control flow diagram for page steal processing. At 501, the steal target is calculated. This is defined as three times the number of frames requested in the current request. This target is implementation sensitive—it may be adjusted so that the benefit of the frames being stolen is balanced against the frequency and path length of the reclaim algorithm. At 502, the current dataset index is fetched. This is simply an index into the DST which tracks the dataset which is currently being stolen from. At this point, it will still reflect the dataset last stolen from. At 503, the next dataset in the dataset table is selected and the dataset index is incremented. Cached data sets are thus processed in round-robin fashion. At 504, the first reader on the order queue, or the ACBT queue, (FIG. 3 at 304C) for the current dataset, is selected. The first reader will be the one currently positioned at the lowest RBA value of all the readers in the dataset. This current RBA value is maintained in the ACBT (FIG. 3 at 309B). At 505, a test is made whether any frames exist for this dataset in the hiperspace cache behind the current reader, that is with RBA values lower than that of the position of the current reader. If so, at 506, a number of frames in the cache are stolen, that is are freed for reuse. In doing this, the routine begins with the frames just behind the current reader, that is with lower RBAs than the position of the current reader. Proceeding backward (i.e., to lower RBA values) frames are stolen until the number of frames discarded equals the minimum of A: the number of frames existing before the current reader or B: the steal target. At 507, a test is made whether the number of frames stolen is equal to the target. If so, the steal routine is exited successfully. If not, or if the test at 505 indicated that no cached frames existed behind the current reader, then a calculation to determine the least valuable frames in the cache for this dataset is performed and they are stolen 508. This process is outlined in more detail in FIG. 6 and will be explained below. At 509, a test is again made whether the pages stolen thus far is equal to the target. If so, the steal routine is successfully exited. If the number of frames stolen so far is less than the target, i.e., the test at 509 resulted in a no answer, then a further test is made at 510 whether all frames have yet been stolen from the current dataset. (This determination is made by testing a value called "distance" for zero, which will be further explained in FIG. 6. A distance value of zero indicates that all frames in this dataset have been stolen.) If the test at 510 indicates that additional frames backing portions of this dataset remain to be stolen, then the calculation of the then least valuable frames is recomputed at 508 and processing continues as indicated above. If the test at 510 indicated that no further frames remain to be stolen from this dataset, then the next dataset is selected from the DST (Data Set Table) table, and the index of a current dataset is incremented 503, and processing continues as indicated above.

FIG. 6 shows the flow of control for identifying and stealing the least valuable frames. The object of this processing is to identify the CLSB associated with the least valuable frames in the cache, and to identify the least valuable frame within that cluster—from which frame stealing will proceed backward until the target is reached (or there are no more to steal). At 601, an initial distance value (D0) is set equal to zero. (Note: if the processing described in this figure does not result in discarding any frames, then this distance value will remain zero, which will result in the test at 510 in FIG. 5 discovering that all frames have been stolen from the current dataset.) At 602, the second ACBT on the ACBT queue is selected. (The frames behind the first reader will already have been stolen.) At 603, a test is made whether such an ACBT (at this point associated with a second reader) exists. If such an ACBT does exist, a test is made at 604 whether this ACBT is associated with a CLSB. If so, indicating that the reader associated with the ACBT is located within a contiguous stretch of cached records, a value H1 is set equal to the current RBA location of the current ACBT (605), and a value L1 is set equal to the RBA value of the previous ACBT (606). A distance value D1 is then set equal to the difference between H1 and L1 (612). This distance value will at this point equal the distance between two successive readers. A test 613 is then made whether D1 is greater than the current value of D0. If so, 614, the address of the current CLSB is indicated to be the best CLSB value, H1 is indicated to be the best RBA value, and D0 is set to the new value of D1. Then, 615, the next ACBT on the ACBT queue is selected, and processing continues as indicated above as 603. If the test at 613 did not indicate that the value of D1 is greater than the previous value D0, then we have not found a new maximum value, and the setting of values in block 614 is bypassed, and the next ACBT is selected 615. If the test at 604 did not indicate that the current ACBT is associated with a CLSB, this means that the associated reader is not located within an in-cache stretch of data. Stealing, if appropriate, must then begin within the previous cluster. At 607, the closest cluster block with an RBA range less then or equal to the RBA in the current ACBT is selected. A test is made at 608 whether such a cluster block is found. If not, there is no previous cluster to steal from, and the next ACBT is selected 615. If such a cluster is found, the value H1 is set equal to the highest RBA value within this cluster 609. Then, 610, the closest ACBT on the ACBT queue with an RBA location less than or equal to H1 is selected, and, 611, L1 is set equal to the RBA location of this newly found ACBT. Processing then continues as indicated above at 612. If the test at 603 did not indicate that an ACBT to be selected exists, (indicating that all ACBT's have been selected and processed), then a final set of processing must be executed since there may be an in-cache stretch beyond the position of the last reader in the cache. At 616, the last CLSB is selected. The value H1 is then set equal to the highest RBA value within the selected CLSB. Then, 618, the last ACBT on the ACBT queue is selected. The value L1 is set equal to the RBA location of this last ACBT (619). The distance value D1 is then computed to be the difference between H1 and L1 (620). A test is then made whether D1 is greater than the existing D0 value 621. If so, 622, we have a new optimum stealing location, and the best CLSB value is set equal to the address of this current CLSB, H1 is indicated to be the best RBA location, and D1 is substituted for D0. If not, this processing at 622 is bypassed. A test is then made whether D0 still is equal to the 0 (623). If it does not equal 0, this indicates that a candidate has been located, and frames are discarded from the calculated best CLSB beginning at location best RBA (624). If however, D0 does equal 0, no candidate has been located, and this discarding process is bypassed and the routine is simply exited.

Figure 7B:
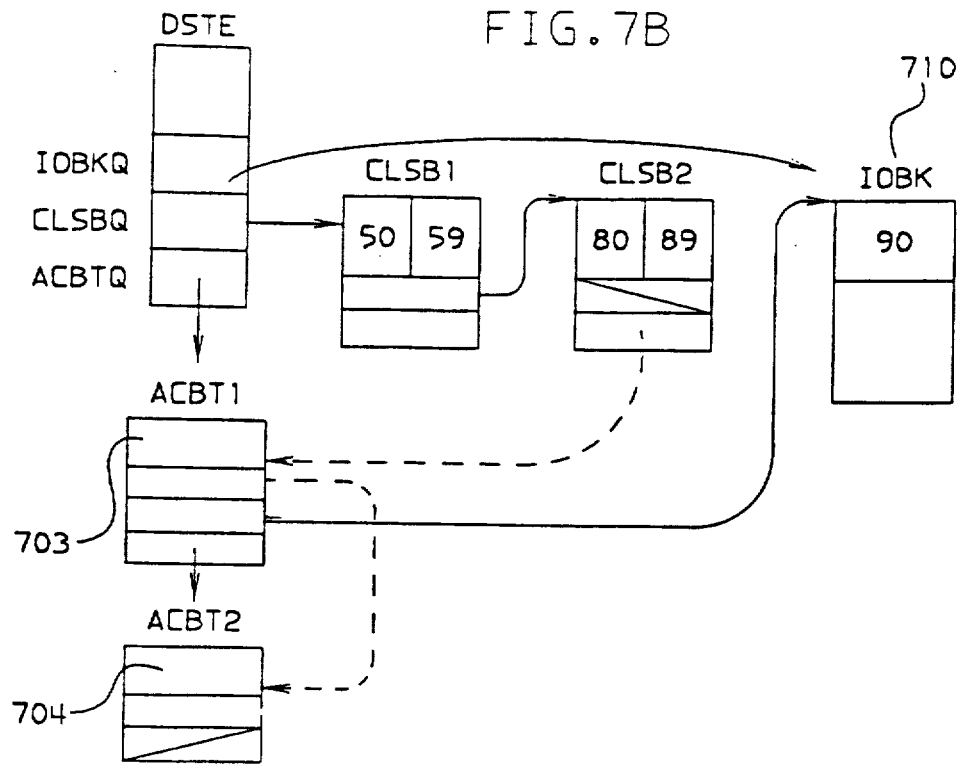
Figure 7C:
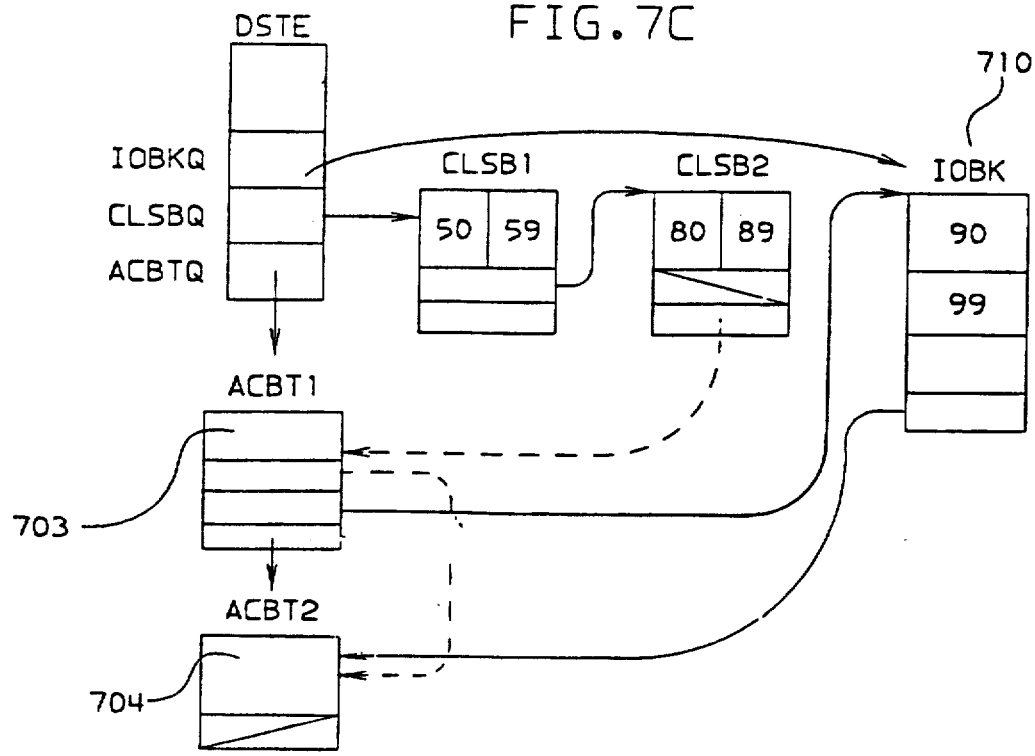
Figure 7E:
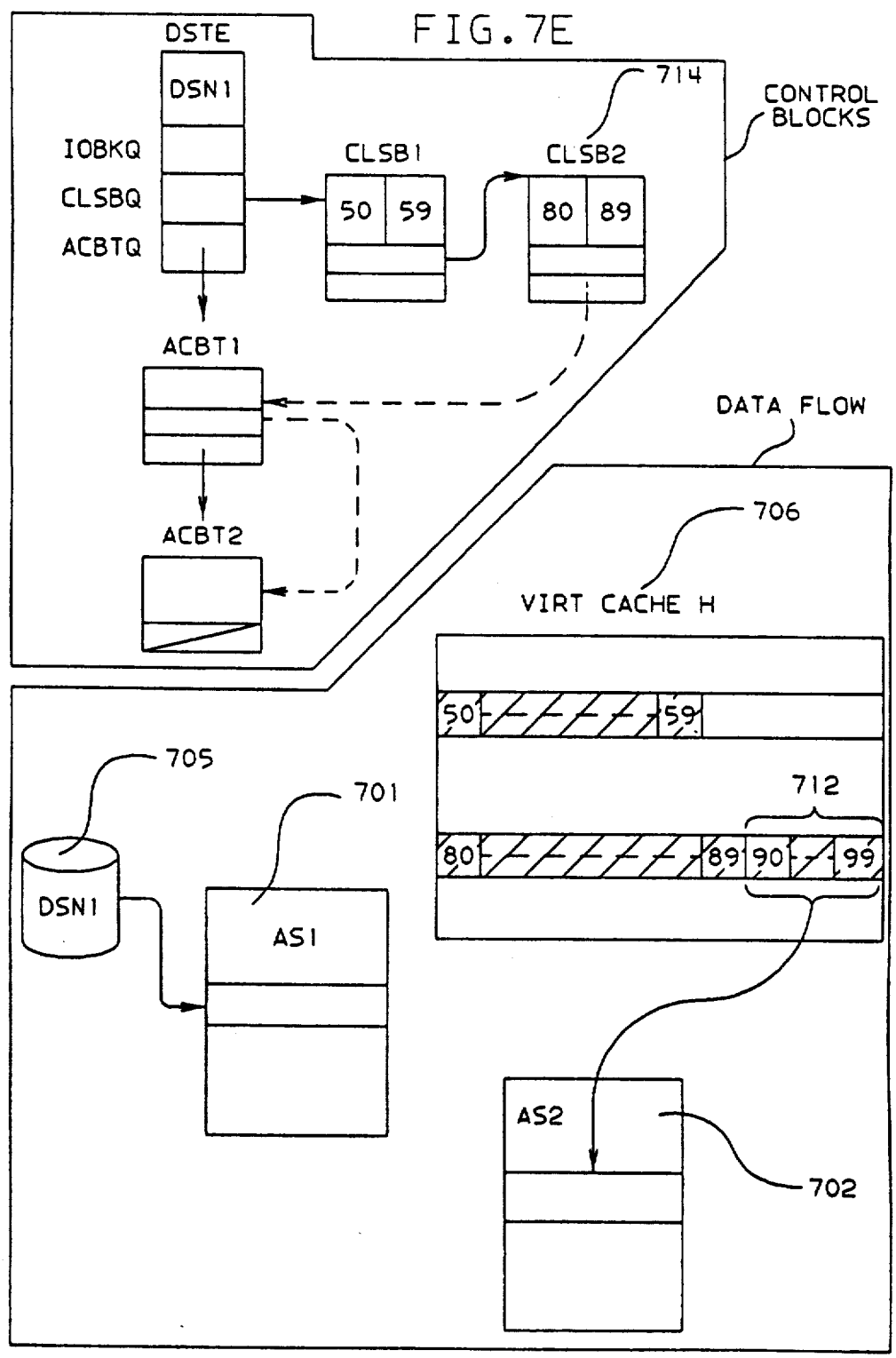

FIGS. 7A thru 7E illustrate the I/O queueing mechanism used to promote "clustering" of readers by means of an example. (The control block contents in this and the subsequent highlight only fields relevant to the examples. The various arrows illustrate conventional control block chaining.) In FIG. 7A reader job one (701) and reader two (702), represented by ACBT 1 (703) and ACBT 2 (704) are both processing records of data within blocks 80 to 89 of dataset 1 (705). Hiperspace virtual cache H 706 is being used to cache this data. Cluster block 2 (707) represents this contiguous stretch of data in hiperspace 706. (Note that both readers are chained (via the ACBT pointer in the CLSB (Cluster Block Overe), 308D, and the CLSBQ pointer in the ACBT 309G) to CLSB2 (Cluster Block 2), as illustrated by the dotted line.) Cluster block 1 (708) represents another contiguous stretch of data in the hiperspace, not currently being processed by either of the two readers. No I/O operation is currently in progress, indicated by the absence of any IOBKs 709. In FIG. 7B, reader 1, represented by ACBT 1 (703) now requires blocks 90 thru 99 and initiates an I/O operation, represented by I/O block 710. The access method suspends reader 1 because of the I/O initiated, as usual. In FIG. 7C, before the I/O operation initiated by reader 1 completes, reader 2 (represented by ACBT 2 704), requires blocks 90 thru 99. Since the low RBA number of reader 2's new requirement matches the low RBA number of an I/O already in progress, indicated in the I/O block 710, reader 2's ACBT (704) is queued on the I/O block to await the completion of the I/O operation. This queueing is performed by chaining ACBT 2 704 to the I/O block 710. Reader 2 is then suspended in accordance with this invention. In FIG. 7D, at the completion of the I/O operation, blocks 90 thru 99 are moved from reader 1's local buffer 711 into the hiperspace at 712 Cluster block 2 713 is then updated to reflect the new size of the contiguous blocks of data, now reaching from block 80 thru blocks 99 (see FIG. 7E at 714). Reader 2 is removed from the IOBK waiter list, and the IOBK is freed. Then reader 2 is resumed. Control is returned to the access method and reader 1 is allowed to proceed. At FIG. 7E, reader 2's request for blocks 90 thru 99 is able to be satisfied from hiperspace 706. No physical I/O is actually performed; blocks 90 thru 99 (712) are moved into reader 2's local buffer 713.

Figure 8A:
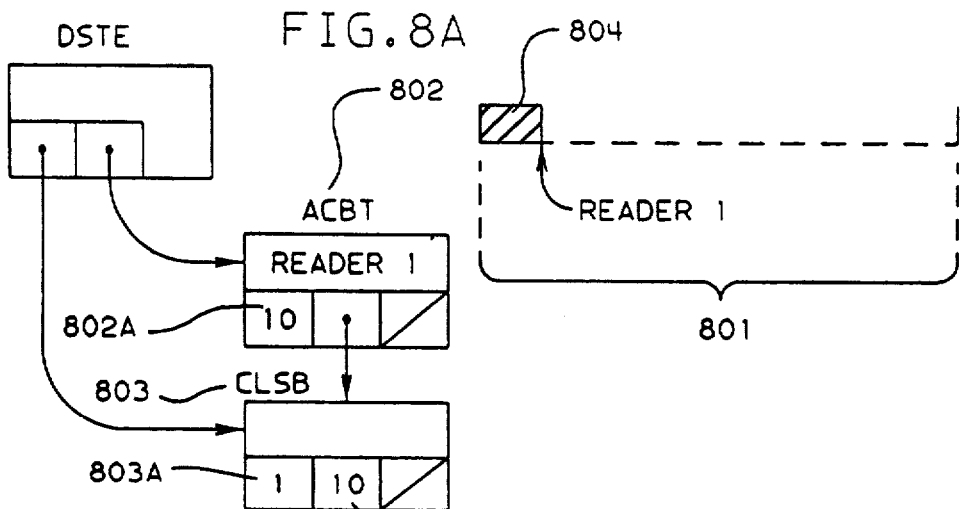
Figure 8B:
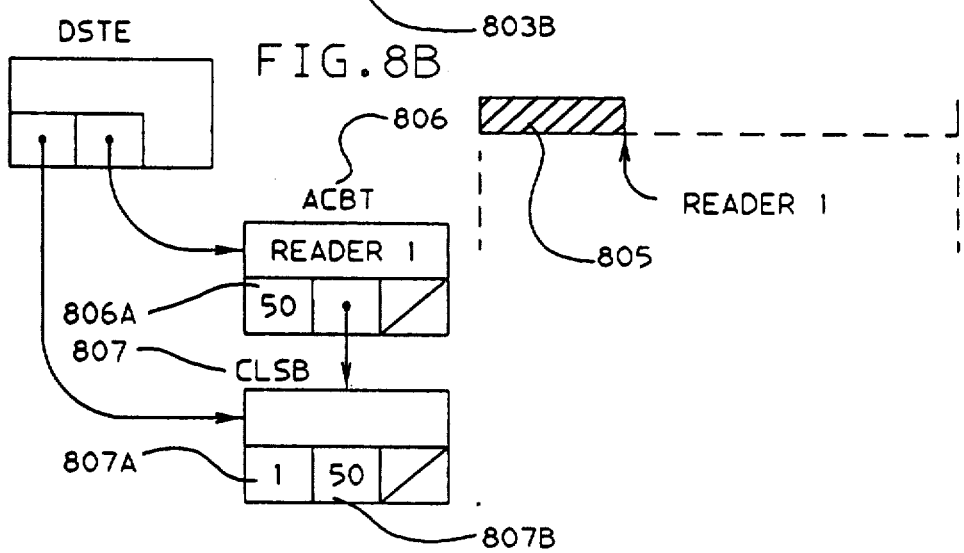
Figure 8C:
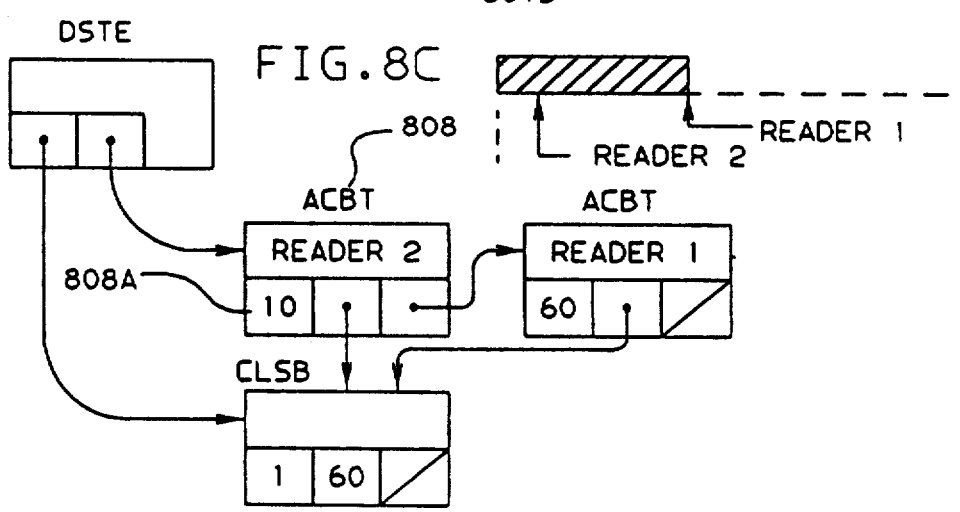
Figure 8G:
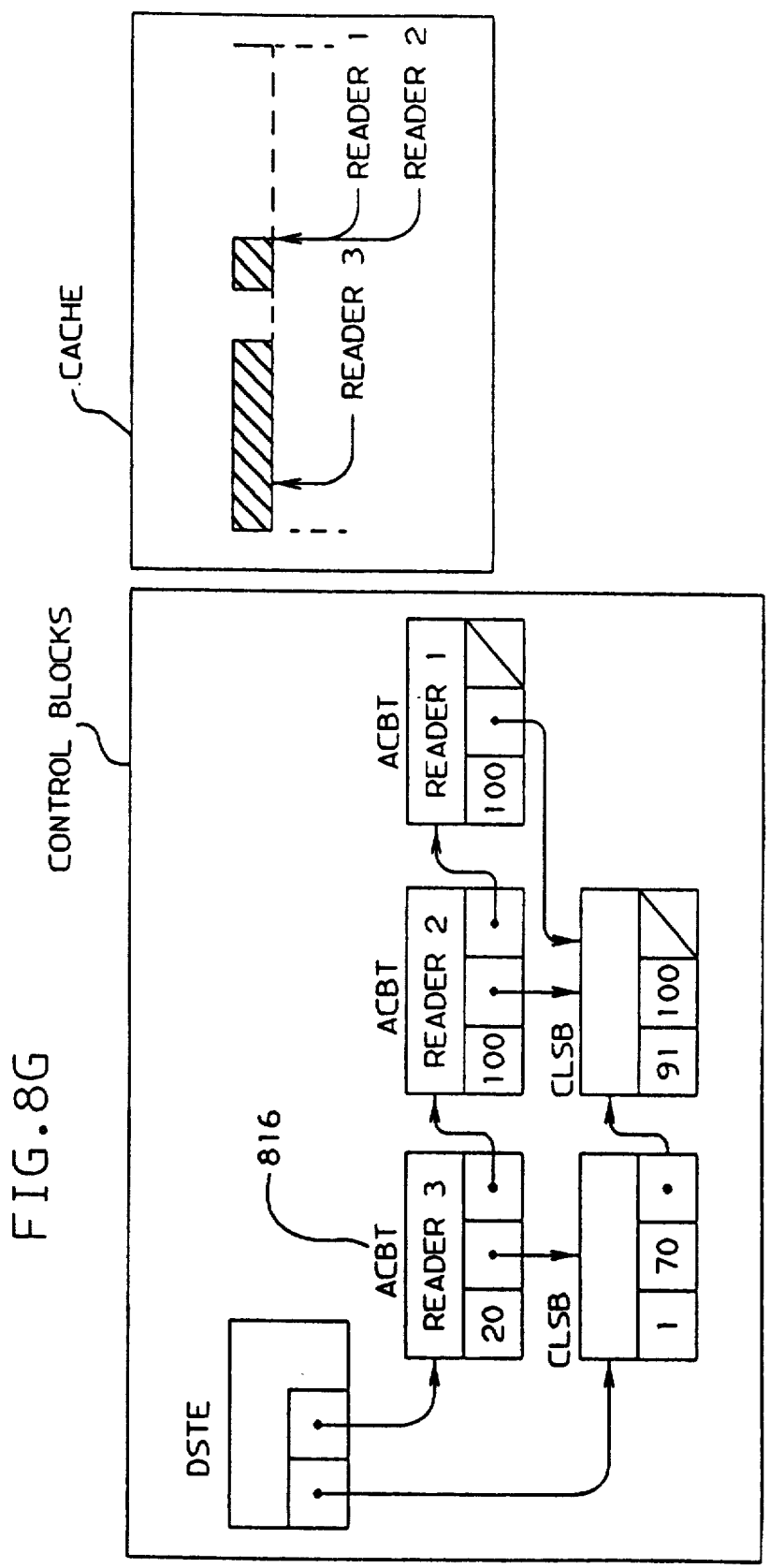
Figure 8H:
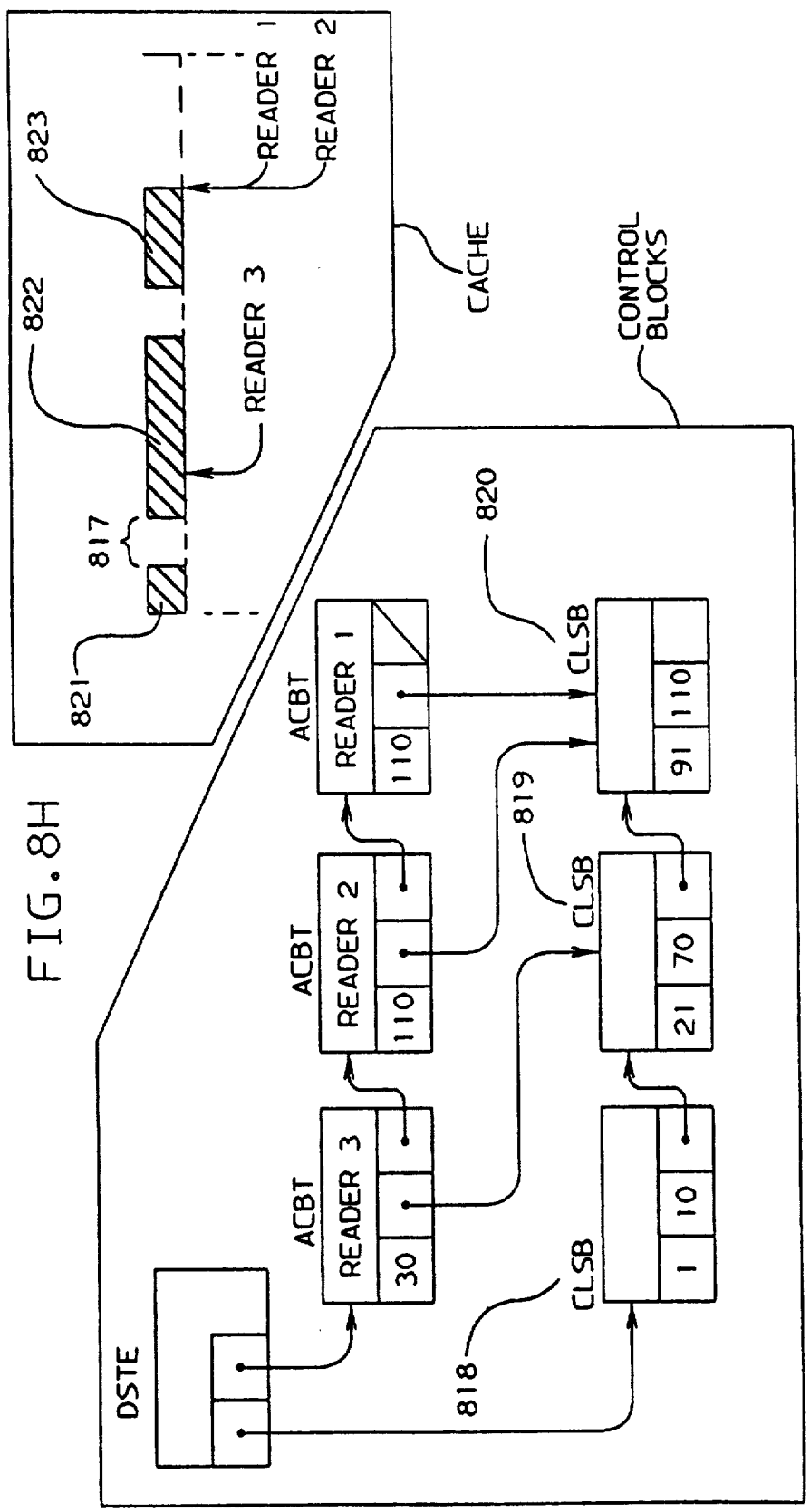
Figure 8I:
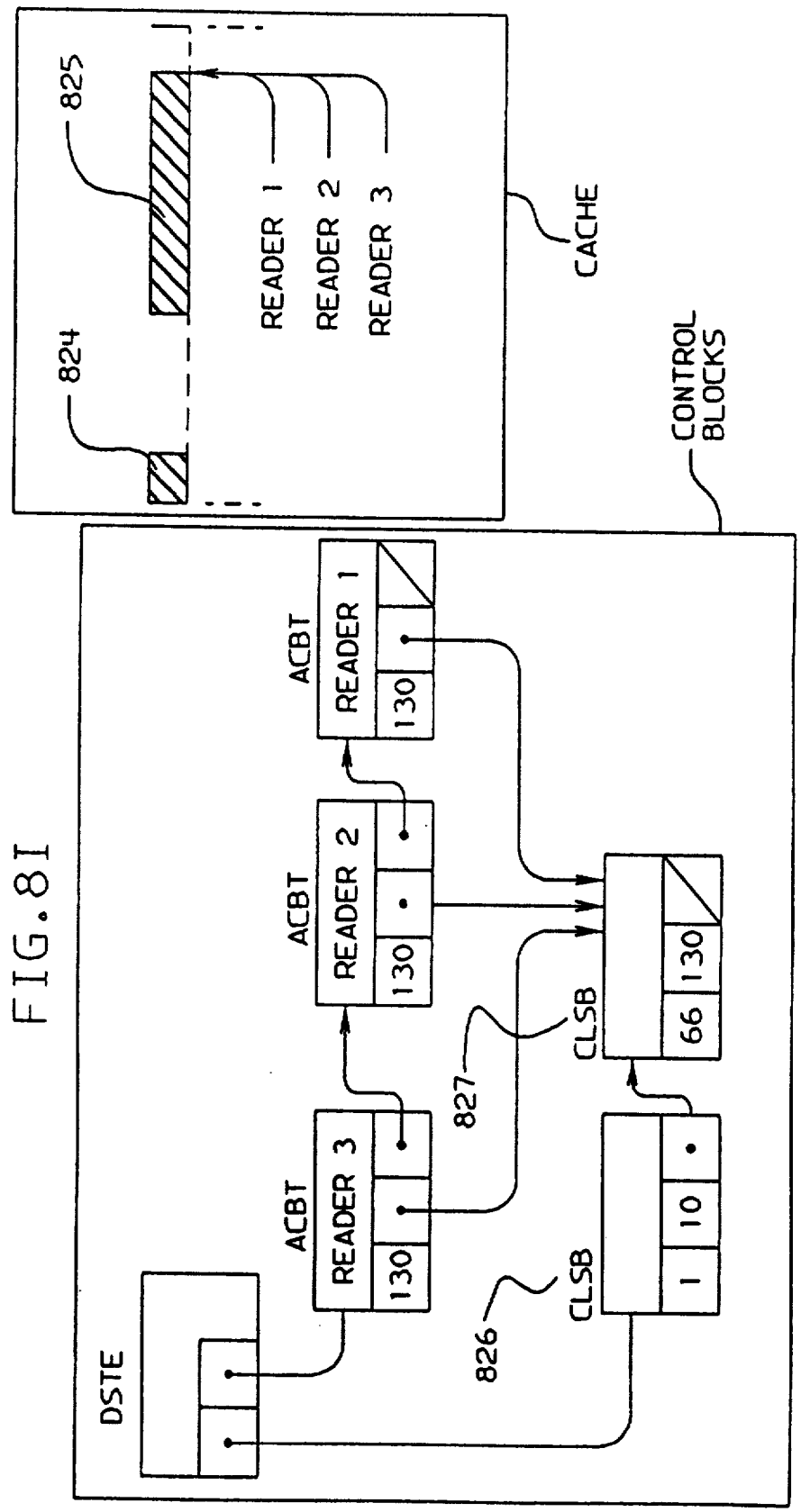

FIGS. 8A through 8K further illustrate this first embodiment of the present invention. In 8A, reader 1 begins to sequentially read a dataset. Hiperspace cache 801 is used to cache page frames associated with this dataset. ACBT 802 represents reader 1, with the current RBA indicator within this ACBT indicating reader 1's current position reading the dataset. At this point, the RBA indicator 802A indicates position 10. Since there is only one stretch of contiguous data within the hiperspace cache, 804, there is only one cluster block, 803. This cluster block indicates the low RBA number to be 1 (803A), and the high RBA number to be 10 (803B). In 8B, as reader 1 continues to read the dataset sequentially, the stretch of frames in the cache grows (805). The ACBT associated with reader 1 now indicates reader 1's position to be position 50 (806A), and the cluster block indicating the stretch of data in the hiperspace cache has a low RBA indication of 1 (807A) and a high RBA number of 50 (807B). In 8C, a second reader, reader 2, has begun to sequentially read the same dataset as reader 1. Since the data previously read by reader 1 is still in the hiperspace cache, reader 2's read requests are satisfied without the need for additional physical I/O. ACBT 808 is associated with reader 2, and indicates reader 2's position within the cache to be position 10 (808A). In 8D, since reader 2 is delayed less for physical I/O, it starts "catching up" with reader 1. (The "clustering" previously mentioned.) This, however, is only part of the advantage of the caching. Perhaps more important than the speed up of reader 2 is the fact that reader 1 is not slowed down by the presence of reader 2. Without the caching, reader 1 would experience additional delays due to waiting for the device to become available after reader 2's I/Os. With the caching, reader 2 is not doing physical I/O, so reader 1 never has to wait for reader 2's I/O to complete. In 8E, reader 2 has caught up with reader 1. Now, one of them will have to request physical I/O, but both will wait until the requested I/O completes. In 8E, both reader 1 and reader 2 are at location 75. This is indicated by both reader 1's ACBT (810) and reader 2's ACBT (809) having RBA numbers of 75 (810A, 809A). This clustering enables prolonged I/O reduction without requiring large number of frames. Once this clustering has occurred, the number of frames required to maintain the cluster is small. Eventually, there will be no additional free frames to use for caching, so some frame stealing must be done. According to the algorithm of the present embodiment, the frames most recently read by the readers are the ones that will be stolen. FIG. 8F shows the condition of the hiperspace cache and the control block structure after this stealing has been done Note that there are now two contiguous stretches of data in the hiperspace cache, 811 and 812. These stretches are separated by space 813, from which the needed frames have been stolen. The two contiguous stretches are represented by cluster blocks 814 and 815. Cluster block 814 is associated with contiguous stretch 812, and extends from a low RBA of 1 (814A) to a high RBA of 70 (814B). Cluster block 815 represents contiguous stretch 811, and reaches from a low RBA of 81 (815A) to a high RBA of 90 (815B). In FIG. 8G, a third reader, associated with ACBT 816, has begun to sequentially read the dataset. Because the part of the cache which was left intact is at the beginning, reader 3 immediately benefits from the frames of data previously read by reader 1 and reader 2. The next time frame stealing is required to be performed, it is the frames most recently referenced by reader 3 which are selected. This is indicated by the vacant stretch 817 in FIG. 8H. The frames recently referenced by reader 1 and reader 2 are not stolen because reader 3 will soon reference them. FIG. 8H illustrates three clusters of contiguous data, 821, 822, and 823, each having an associated cluster block, 818, 819, and 820, respectively. Depending upon many factors, reader 3 may actually catch up with readers 1 and 2. If this happens, as illustrated in FIG. 8I, there will then be three readers serviced by each single physical I/O request. In FIG. 8I, the two contiguous stretches of hiperspace data, 824 and 825, are represented by cluster blocks 826 and 827 respectively. Now, again, any frames stolen will be those most recently referenced by the single cluster of three readers. This is illustrated in FIG. 8J. The recently stolen frames, 828, have split the contiguous stretch in the hiperspace into now three pieces, 829, 830, and 831. These are represented by cluster blocks 832, 833, and 834, respectively. Eventually, all three readers will complete reading the dataset. This is illustrated in FIG. 8K. Since there are now no readers, there are no ACBT's chained off the DSTE 835. The three contiguous stretches of data remain in the hiperspace, and are represented by cluster blocks 836, 837, and 838.

As noted above, the present embodiment of this invention determines the optimum candidates for page stealing based largely on calculations of those frames with the longest expected times until reuse. The present embodiment assumes that all readers are proceeding through the cache at a constant velocity, so that frames with the longest expected times until reuse are assumed to occur either at the front of a stretch of in-cache pages, or directly behind one of the readers. Also, the present embodiment makes no special provisions for prefetching data into the cache.

In an alternate embodiment, computations may be made of the velocities at which different jobs are proceeding through the cache, and these differences may be taken into account in the determining which pages to steal from the cache. Another feature of this alternate embodiment is prefetching of data into the cache, again based upon differences in velocities. Features of this alternate embodiment include a prefetch algorithm, to determine which noncached records should be prefetched and the order in which they are prefetched; a velocity estimation algorithm, to empirically determine the rate at which each reader reads records in each dataset; a use time estimation algorithm, which uses the previously estimated velocity and information on whether intervening records are cached or not to determine the time at which a dataset record will next be referenced by a reader; and a cache replacement or page steal algorithm, to determine which record in the cache should be stolen when a new record is placed into a full cache. These algorithms are described as follows:

VELOCITY ESTIMATION ALGORITHM

The velocity of a job $J_i$ through a dataset $D_j$ is denoted $V_{ij}$ and is the rate at which $J_i$ is reading records in $D_j$. The Velocity Estimation Algorithm computes an estimate of the job's attainable velocity through the dataset. The attainable velocity is the rate at which a job would proceed through a dataset if it encountered no cache misses on any dataset. The Velocity Estimation Algorithm is executed periodically and the interval between invocations is denoted $\Delta$ which is a parameter to the algorithm. Assume that at time $t_0$ job $J_i$ is reading record $r_{ij}$ in dataset $D_j$. At some future time $t_0 + \Delta$ let the total I/O delay incurred by job $J_i$ since $t_0$ be $b_i$. If at time $t_0 + \alpha$, $J_i$ has read up to record $c_{ij}$ in dataset $D_j$, its attainable velocity is estimated as $$V_{ij} = \frac{(c_{ij} - r_{ij})}{(\Delta - b_i)}.$$

The Velocity Estimation Algorithm has two subfunctions. The first is invoked each time a job submits a read request to the cache manager. This function updates the following variables:

1. $c_{ij}$: The current position of job $J_i$ in dataset $D_j$.
2. $b_{ij}$: The total I/O delay job $J_i$ has accrued since its velocity in $D_j$ was last measured.
3. $t_{ij}$: The last time $J_i$'s velocity was measured in dataset $D_j$.

Figure 9:
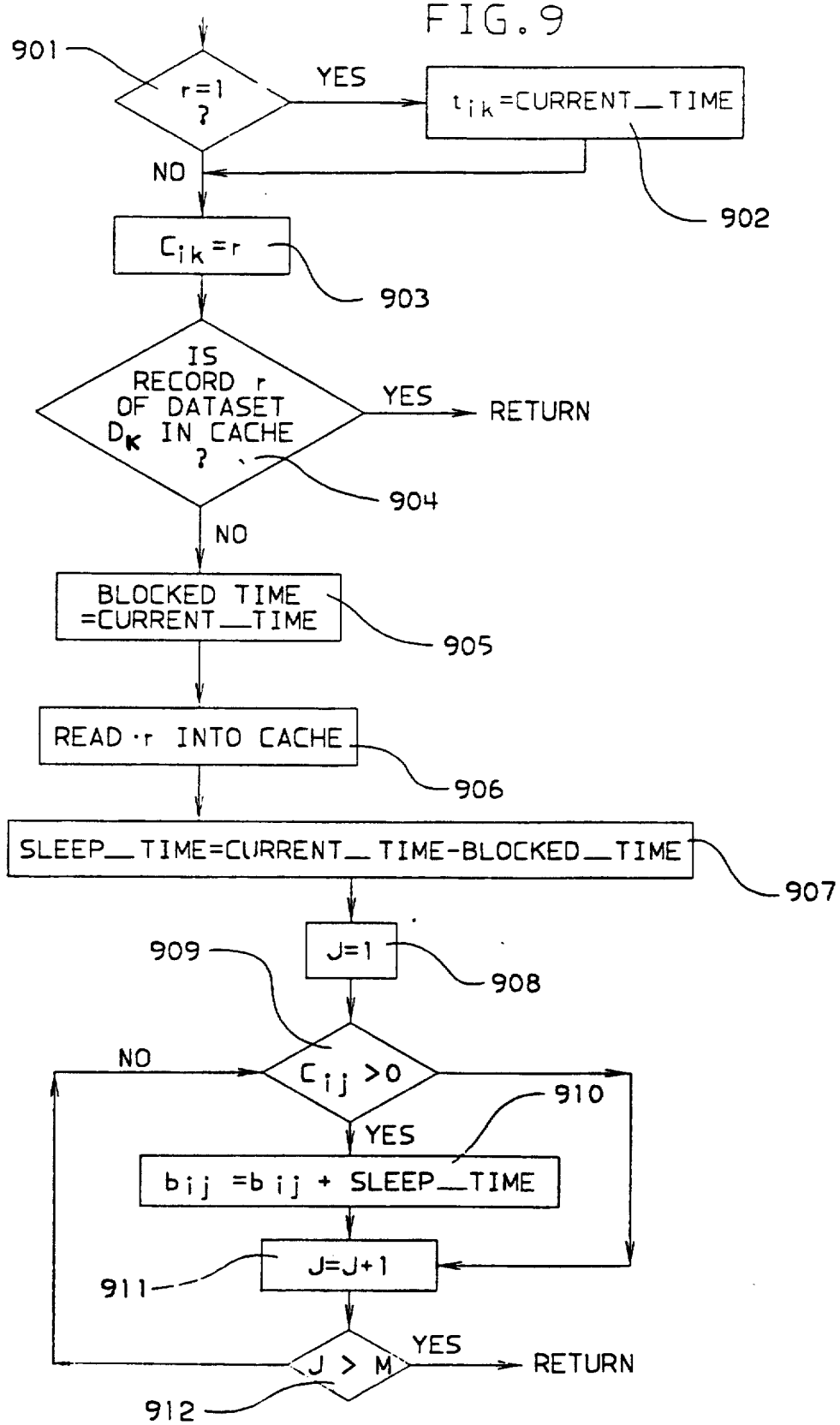
FIG. 9 is a flowchart illustrating first subfunction of the Velocity Estimation Algorithm used in the second embodiment.

FIG. 9 depicts the Velocity Estimation Algorithm's processing for each read I/O submitted by a job. In this code, job $J_i$ is reading record r in dataset $D_k$. At 901 a test is made if the record is the first one in the dataset. If this is the case, 902, $t_{ik}$ is set to the time $J_i$ started reading $D_k$, which is returned by the system function Current_Time. The current position of the job is recorded in $c_{ik}$ at 903. If r is in the cache, 904, the Velocity Estimation Algorithm simply returns. If r was not in the cache, 905, record r must be read into the cache, the time is recorded in the variable blocked_time at 905, and the I/O is started 906. When the I/O has completed, the total time the job was blocked while r was being read into the cache is Current_Time—blocked_time. At 907-912, the total time the job has been blocked is updated for all data sets the job is reading.

Figure 10:
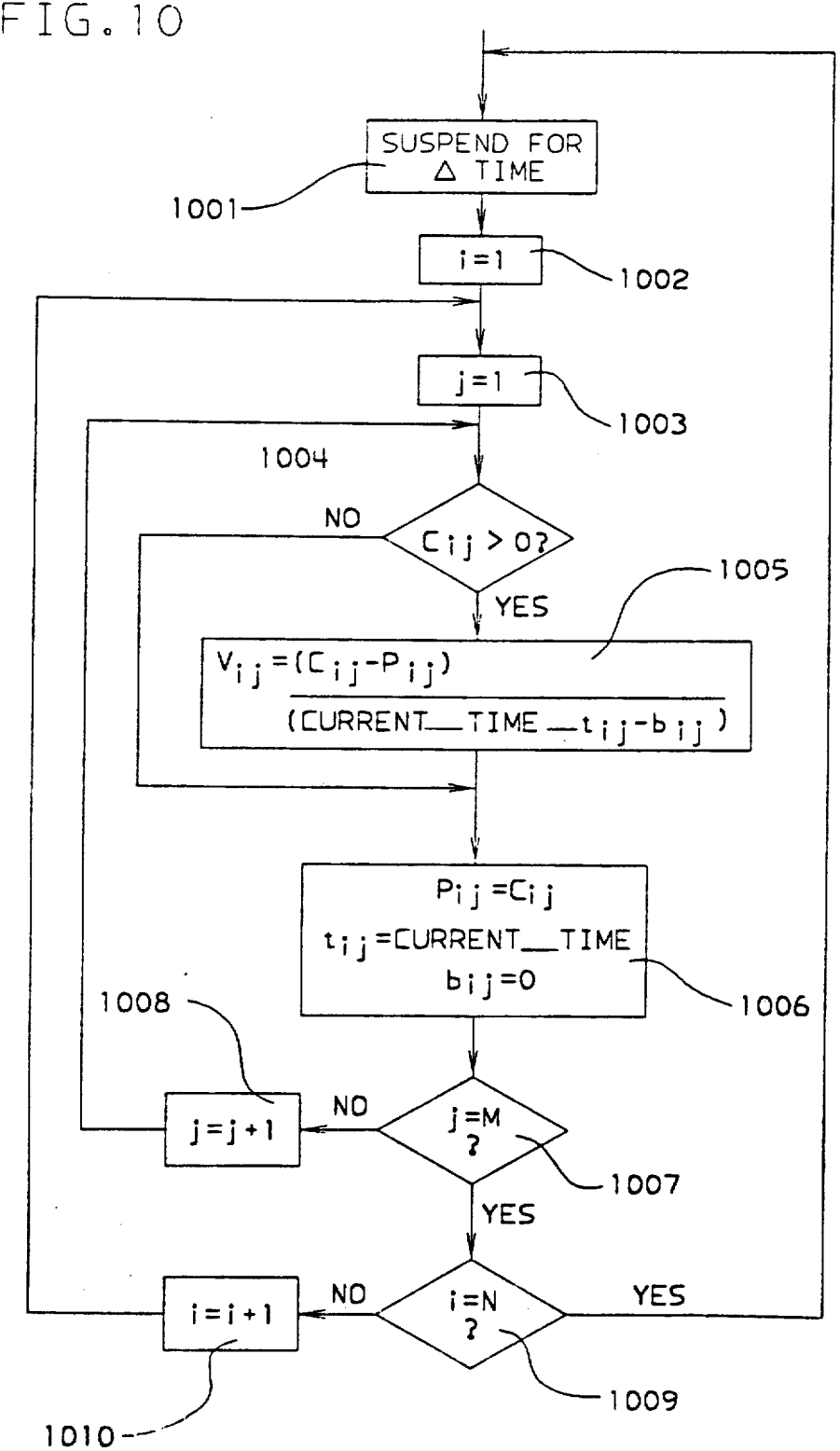
FIG. 10 is a flowchart illustrating the second subfunction of the Velocity Estimation Algorithm used in the second embodiment.

FIG. 10 shows the second Velocity Estimation Algorithm subfunction—the asynchronous velocity estimation function which is invoked every $\Delta$ time units. The interval between invocations is implemented by suspending for time ($\Delta$) at 1001. Before any velocities are estimated, the variables used in the flowchart ($c_{ij}$, $t_{ij}$, $v_{ij}$, $p_{ij}$, $b_{ij}$) are set to zero. The two loops (1003–1008 and 1002–1010) check the position of every job in every dataset. If the position is nonzero, $J_i$ is reading dataset $D_j$. Block 1005 computes the estimated velocity attainable. This is defined as the total distance traveled in the dataset since the last velocity estimate, which is ($c_{ij}-p_{ij}$), divided by the total time the job was active during the interval of time from $t_{ij}$ to Current_Time. This is simply Current_Time$-t_{ij}-b_{ij}$. At 1006, the variables are reset for the next interval.

USE TIME ESTIMATION ALGORITHM

The Use Time Estimation Algorithm is invoked after each recomputation of the jobs' velocities. This algorithm uses the estimated velocity of job $J_i$ through dataset $D_j$ to compute the time $J_i$ will read record r of $D_j$. Let $c_{ij}$ be the record ID of the position of $J_i$ in $D_j$ and let $V_{ij}$ be the velocity in this dataset. The algorithm estimates that job $J_i$ will read ("use") record $c_{ij}+k$ in $$\frac{k}{V_{ij}}$$

time units

The Use Time Estimation Algorithm is parameterized by the look ahead time L. In L time units, job $J_i$ will use records $c_{ij}+1$, $c_{ij}+K$ of dataset $D_j$, where $K = Floor(L \cdot V_{ij})$. In this case, the use time of $c_{ij}+p$ with respect to $J_i$ is defined as $(p/K) \cdot L$. The K records $c_{ij}+1$, $c_{ij}+2, \ldots, c_{ij}+K$ are said to be in the look ahead of job $J_i$.

FIG. 11 presents an example that illustrates the cache management algorithms of the second embodiment. The horizontal line represents a dataset and the hash marks represent records. Circles indicate cached records. The arrows represent the velocities and look ahead of jobs 1, 2 and 3. For example, the first record in job 2's look ahead is record 10. The use time of record 10 with respect to job 2 is (1/5)·L. The sets below the horizontal line represent the tables, or lists, used in this embodiment and described below: the "behind last job" list; the "not seen" list; the "use time" list; and the "prefetch candidate" list.

It is possible that not all K records in $J_i$'s look ahead are cached. In this case, some of the records in the look ahead of $J_i$ must be read from disk. Let T be the average time required to read a record from the disk and insert it into the cache. If there are q noncached records in the set $\{c_{ij}+1, c_{ij}+2, \ldots, c_{ij}+(p-1)\}$, the use time of record $c_{ij}+p$ with respect to job $j_i$ is $$\frac{p}{K} \cdot L + q \cdot T$$

The use time includes the I/O delays that will occur before $J_i$ can use record p. In the example, the use time of record 5 with respect to job 1 is $(2/3)\cdot L + T$.

A given record r may be in the look ahead of several jobs. In this case, its use time is defined as the minimum use time with respect to all jobs. The use time is computed for each record in the cache. The use time is also computed for records that are not cached but are in the look ahead of some job. This is used for prefetching purposes and is described later. In either case, UT[j,r] denotes the use time of record r in dataset $D_j$.

FIG. 12 sets the use times of cached and noncached records that are in the look ahead of at least one job. The first two loops (steps 1201-1207) reset all use time to an infinite default value. (An arbitrarily large value.) The second two loops (steps 1208-1224) examine every job in every dataset. If $J_i$ is current reading $D_j(c_{ij}>0)$, the length of its look ahead is computed at 1215. The variable q records the number of noncached records in $J_i$'s look ahead in dataset $D_j$. This variable is initialized to 0 in at 1216. The loop from 1217-1224 examines every record in the look ahead. Step 1219 computes the use time of record $c_{ij}+p$ in dataset $D_j$ with respect to $J_i$ which includes the transfer times for the q missing records. If this is less than the previously computed use time, the record's use time is set to the new value. Step 1221 tests if record p is cached, and if it is not the counter q is updated at 1222.

The Use Time Estimation Algorithm builds a list containing all cached records which is used by the Cache Replacement Algorithm. This list is sorted from largest to smallest use time. There is one complication. There may be cached records that are not in the look ahead of any job. These records fall into two classes. The first class are those records that are behind the last active job in their dataset. The second class contains records that are not behind the last job in the dataset but are not in any jobs look ahead. The Use Time Estimation Algorithm builds three sorted lists of cached records, which are the following:

1. The behind_last_job_list containing records behind the last job in their data sets. This list is sorted from largest to smallest records ID. In the example of FIG. 11, this list is {3, 2, 1}.

2. The not_seen_list containing records not in the look ahead of any job and not behind the last job in their dataset. This list is sorted from largest to smallest record ID. In the example of FIG. 11, this list is {15, 7}.

3. The use_time_list containing records in job lookaheads. This list is sorted from largest to smallest use time and is {13,5,9,11,10} in the example of FIG. 11. (In this example, T=(L/2).)

How the Cache Replacement Algorithm uses three lists to make replacement decisions is described below:

Overhead Considerations

Let $S_c$ be the number of records in the cache. The Use Time Estimation Algorithm builds three sorted lists of cached records, which requires time $O(S_c \cdot \log S_c)$. This overhead can be reduced by not fully sorting the lists. Each list can be partitioned into Q sets of records, and each set is not sorted. For the use_time_list each set contains records with approximately the same use times. The maximum number of records that can be transferred from disk into the cache during the next L time units is q=(L/T). Assume that the Use Time Estimation Algorithm does not examine records in $J_i$'s look ahead after q noncached records are observed. The range of values for use times in the use_time_list is [0,2L]. The i-th partition set contains each cached record p with use times in the range $$\left(\frac{i}{Q}\right)2L \leq UT[p] < \left(\frac{(i+1)}{Q}\right)2L$$

for i=0, 1, ..., Q−1. The partitions for the other lists are defined similarly and each partition contains records with nearly equal IDs.

The partitions can be represented by three tables indexed from 0 to Q−1 which are the 1) behind_last_job table, 2) the not_seen_table, and the 3) use_time_table. These tables can be built in time $O(S_c)$.

The overhead of the Use Time Estimation Algorithm can be controlled by setting the parameters and L. The parameter determines how often the velocity and use time estimation is invoked and L controls the complexity of processing the lookaheads. The optimum values are a function of the particular job mix—a reasonable value would be Δ=between 5 and 10 seconds, and L=2·Δ. Finally, these algorithms do not directly delay the processing of read requests that jobs submit. These two algorithms can be run as a background job and their overhead only indirectly effects the performance of the batch jobs.

CACHE REPLACEMENT ALGORITHM

The Cache Replacement Algorithm determines which cached record is replaced when a newly read record is inserted into the cache and the cache is full. The record replaced is the one with the highest use time. By construction, the records in the not_seen_list have use times that are greater than the use time of any record in the use_time_list. The next use time of a record p in dataset $D_j$ that is in the behind_last_job_list is determined by the time a new batch job starts reading $D_j$. The Cache Replacement Algorithm assumes that this time is greater than the use times of records in the not_seen_list. If two records p and p+1 are both in the behind_last_job list, record p +1 will have higher use time. This explains why the behind_last_job list is sorted from largest to smallest record ID. The reason for sorting the not_seen_list from largest to smallest record ID is to avoid replacing records in front of the slower readers in the data sets. This is important if elapsed time is the performance metric to optimize.

The Cache Replacement Algorithm first replaces on demand all records in the behind_last_job_list (FIG. 15 at 1501, 1502), followed if needed by all records in the not_seen_list (1503, 1504) and finally all records in the use_time_list (1505, 1506). If a request is still not satisfied, the velocity and use time estimation algorithms are rerun 1507, and stealing is reattempted.

If the three tables of partitions are used in place of the three lists, the replacement order is: 1) behind_last_job_table, 2) not_seen_table, and 3) use_time_table. All three tables are examined from index $Q-1$ down to 0 and the head of the first nonempty set is replaced. The scanning overhead can be eliminated by concatenating the 3-Q lists in their steal ordering to form a single list.

PREFETCH ALGORITHM

Each dataset $D_j$ has a dedicated prefetch job that prefetches records for batch jobs reading $D_j$. In this embodiment we assume that there is a one-to-one mapping between the data sets and disks. Only one I/O at a time can be in progress on a disk, which means that there is no need for more than one prefetch job per dataset. Our prefetch algorithms easily generalize to the following cases:

1. Multiple datasets per disk
2. Datasets that occupy multiple disks
3. Disks that support multiple simultaneous I/Os.

Figure 13A:
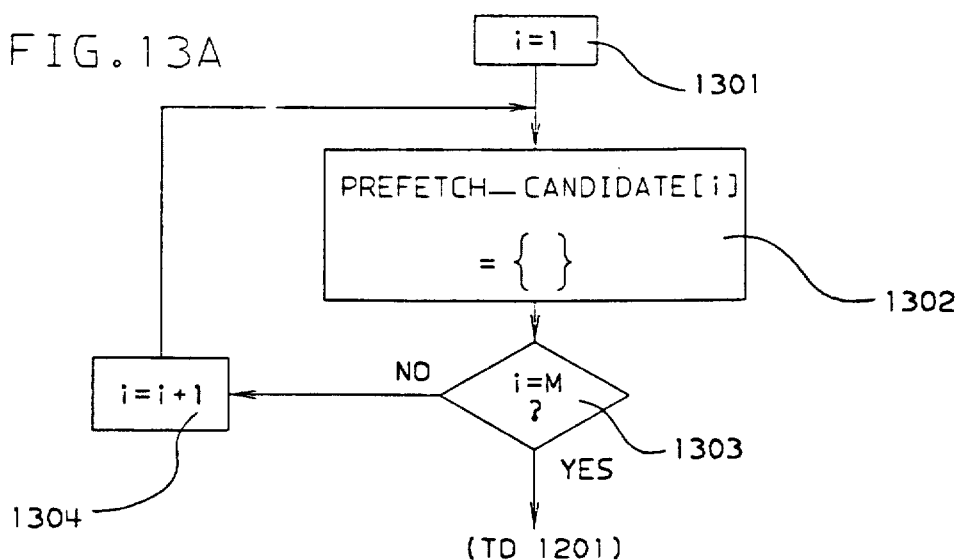
FIGS. 13A, 13B, and 13C are flowcharts illustrating control flow changes to FIG. 12 required to build prefetch candidate lists.
Figure 13B:
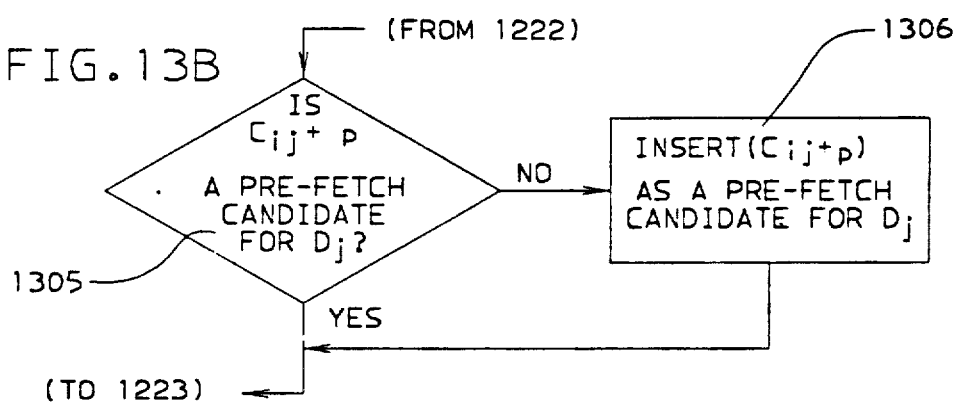
Figure 13C:
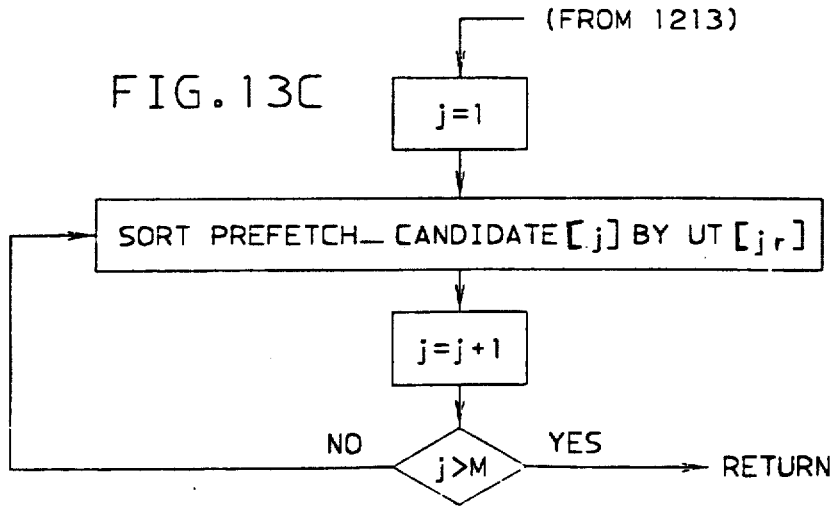

The order in which records from dataset $D_j$ are prefetched is based on use times (deadline) set by the Use Time Estimation Algorithm. A record that is not in the look ahead of a job and is not cached is called a prefetch candidate. The Use Time Estimation Algorithm, illustrated in FIGS. 12A and 12B, builds a list of prefetch candidates for each dataset. The list of $D_j$ is denoted prefetch_candidate [j] and is sorted from smallest to largest use time. The prefetch candidate lists are to be built by making 3 additions to FIG. 12, as indicated in FIG. 13A, 13B and 13C. The first addition is illustrated in FIG. 13A, and would precede step 1201 of FIG. 12. It simply initializes the lists. The second addition is illustrated in FIG. 13B, and would follow steps 1222 of FIG. 12.

This addition inserts the prefetch candidate in the list if this is the first time it has been found in a job's look ahead. The final addition to FIG. 12 follows the two loops that set the use times (i.e. follow the "YES" path out of step 1206 in FIG. 12), and are illustrated in FIG. 13C.

The list of candidates is sorted from smallest to largest use time. The list of prefetch candidates for the example in FIG. 11 is {8, 4, 12, 14, 6}.

Figure 14:
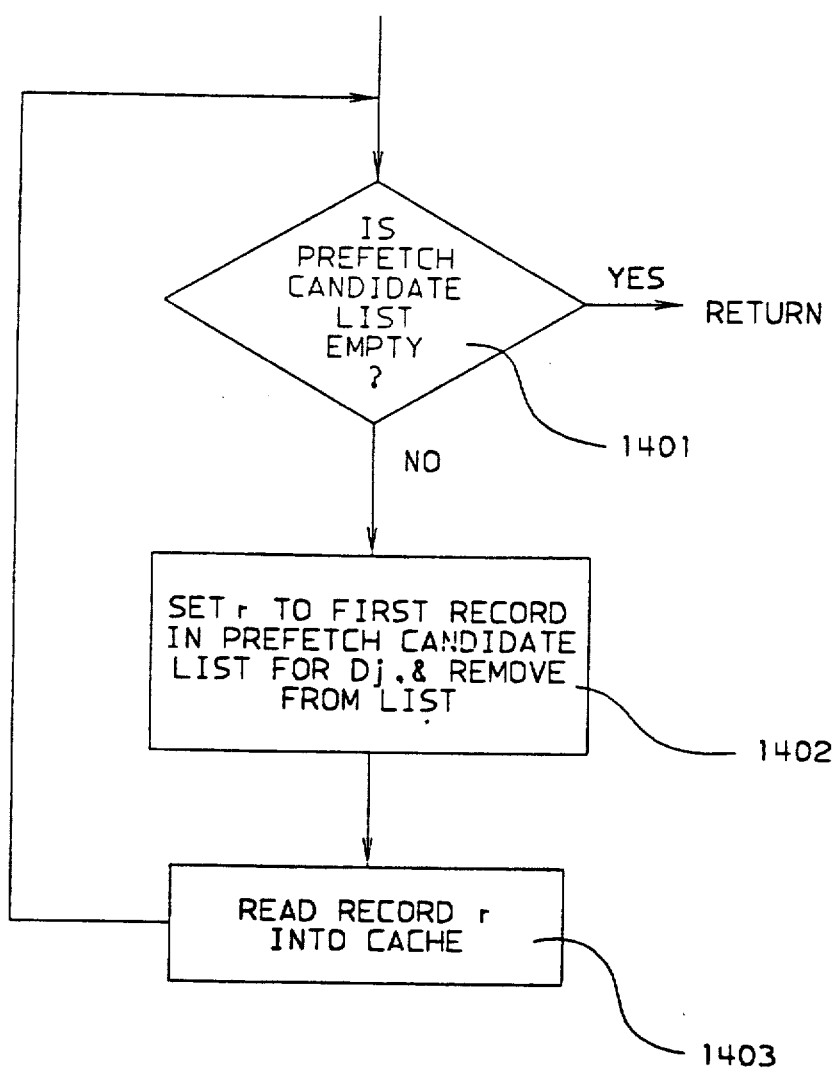
FIG. 14 is a flowchart illustrating control flow for the asynchronous prefetch job of the second embodiment.

After the prefetch lists have been built, the asynchronous prefetch jobs begin their work. The prefetch job for dataset $D_j$ removes the next record from the head of the prefetch_candidates[j] list and submits the prefetch I/O to the cache manager. FIG. 14 illustrates control flow for the asynchronous prefetch job for dataset $D_j$. Each prefetch candidate is removed from the list 1402 and read into the cache 1403 until test 1401 determines that there are no more candidates.

The time complexity of building the prefetch candidate lists is $O(S_c \cdot \log(S_c))$ due to the sorting. This complexity can be reduced to $O(S_c)$ by using 25 unsorted partitions as was done for the use_time_lists. The CPU overhead of the prefetch jobs is negligible because each job executes very few I/Os per read.

While the invention has been described in terms of two embodiments, it is recognized by those skilled in the art that the invention is not limited to these embodiments. There are numerous system environments in which the invention can be used without departing from the spirit or scope of the invention as described and claimed.

What is claimed is:

1. In a data processing system having a host processor, attached I/O devices, and a virtual storage cache for caching data sequentially read from a dataset on an attached I/O device by multiple readers executing on the host processor and sharing the cache, a method for managing the cache comprising the steps of:
   (1) Determining that page-stealing is required to free a page of a backing store backing a virtual page in said virtual storage cache before additional data can be placed in the cache;
   (2) determining the page of backing storage to steal based on a sequential usage-based estimate of time until reuse of said page by one of said sequential readers;
   (3) stealing the page of backing storage on demand;
   (4) continuing to steal as necessary until a target of stolen pages is reached.

2. The method of claim 1 further comprising the steps of:
   (1) Creating a prefetch candidate list of dataset pages, each of said dataset pages having an estimated time until use;
   (2) prefetching one of said dataset pages with a smallest estimated time until use into the cache.

3. The method of claim 1 in which said sequential usage-based estimate of time until reuse is calculated on demand based upon location of the virtual page in the cache and distance of the virtual page from a following reader, and directs page stealing in order of said estimate of time until reuse (greater to smaller) first, for virtual pages behind an initial reader in the cache, and second and subsequently, for virtual pages most distant from the following reader.

4. The method of claim 3 further comprising the step of temporarily suspending trailing readers requesting physical I/O for a record currently being read in by a preceding reader, until said record is placed into the cache, so that the trailing readers may retrieve said record from the cache.

5. The method of claim 4 further comprising the step, if more than one dataset is being sequentially read and sharing use of the backing store, of maintaining and incrementing a dataset index, said dataset index indicating which of said more than one dataset from which to steal said page of the backing store, so that balanced stealing is performed in round-robin fashion from all datasets.

6. The method of claim 2 in which said sequential usage-based estimate of time until reuse is calculated periodically based upon location of the virtual page in the cache, distance of the virtual page from a following reader, and velocity of readers progressing through the cache, and directs page stealing in order of said estimate of time until reuse (greater to smaller) first, for virtual pages behind an initial reader in the cache, second, for virtual pages not within a lookahead distance of any reader, and third, for virtual pages in the lookahead distance of some reader.

7. The method of claim 6 in which said estimate of time is further based upon status of pages between said virtual page and said following reader as cached or uncached.

8. A cache management control element in a data processing system having a host processor, attached I/O devices, and a virtual storage cache for caching data sequentially read from a dataset on an attached I/O device by 5 multiple readers executing on the host processor and sharing the cache, said cache management control element comprising:
   (1) Means for determining that page stealing is required to free a page of backing store in processor storage backing a virtual page in said virtual storage cache;
   (2) sequential usage-based reuse time estimation means for determining the page of backing storage to steal.

9. The cache management control element of claim 8 further comprising:
   1) Means for calculating estimated use times of uncached records;
   2) means for prefetching uncached records of said dataset into said virtual storage cache so that records with short estimated use times are first prefetched.

10. The cache management control element of claim 8 in which said sequential usage-based reuse time estimation means comprises:
    (1) An ACBT linked with each of said readers, said ACBT containing an RBA location of said reader;
    (2) a CLSB containing a pointer to a stretch of in-cache data;
    (3) distance calculation means for calculating a largest distance between a page within one of said stretches of in-cache data, and a trailing reader.

11. The cache management control element of claim 10 further comprising means for temporarily suspending a subsequent record-requesting reader after a previous record-requesting reader has initiated physical I/O to read into the cache a record.

12. The cache management control element of claim 11 further comprising dataset index means for selecting, in a round-robin fashion, a dataset as a page-steal candidate, if more than one dataset is being sequentially read and sharing use of the backing store.

13. The cache management control element of claim 9 further comprising velocity estimation means for estimating the best rate at which a job may proceed through a dataset, said estimated best rate being used by said reuse time estimation means to calculate reuse times for cached records, and by said means for calculating estimated use times to calculate use times for uncached records.

14. The cache management control element mechanism of claim 13 in which said reuse time estimation means and said means for calculating estimated use times estimates reuse times and use times based in part on cached or uncached status of pages between a current position of a job in said dataset, and a position of a page within a lookahead.

15. In a data processing system having a host processor, attached I/O devices, and a virtual storage cache for caching data sequentially read from a dataset on an attached I/O device by multiple readers executing on the host processor and sharing the cache, a method of managing the cache comprising the step of coordinating I/O requests from groups of readers to reduce I/O contention between readers within any one of said groups of readers.

16. The method of claim 15 in which said coordinating of I/O requests is accomplished by the step of temporarily suspending trailing readers requesting physical I/O for a record currently being read in by a preceding reader, until said record is placed into the cache, so that the trailing readers may retrieve said record from the cache.

* * * * *

UNITED STATES PATENT AND TRADEMARK OFFICE
CERTIFICATE OF CORRECTION

PATENT NO. : 5,150,472
DATED : September 22, 1992
INVENTOR(S) : Blank, et al.

It is certified that error appears in the above-identified patent and that said Letters Patent is hereby corrected as shown below:

Claim 8, column 15, line 13, after "by" and before "multiple" delete 5.

Signed and Sealed this

Fourteenth Day of June, 1994

Attest:

BRUCE LEHMAN

*Attesting Officer*  *Commissioner of Patents and Trademarks*